United States Patent
Mattern et al.

(10) Patent No.: US 9,208,507 B2
(45) Date of Patent: Dec. 8, 2015

(54) AD NETWORK OPTIMIZATION SYSTEM AND METHOD THEREOF

(71) Applicant: The Rubicon Project, Inc., Playa Vista, CA (US)

(72) Inventors: Julie Mattern, Hawthorne, CA (US); Matt Meyer, Santa Monica, CA (US)

(73) Assignee: The Rubicon Project, Inc., Playa Vista, CA (US)

( * ) Notice: Subject to any disclaimer, the term of this patent is extended or adjusted under 35 U.S.C. 154(b) by 0 days.

(21) Appl. No.: 13/925,285

(22) Filed: Jun. 24, 2013

(65) Prior Publication Data

US 2013/0282478 A1    Oct. 24, 2013

Related U.S. Application Data

(60) Division of application No. 12/552,274, filed on Sep. 1, 2009, now Pat. No. 8,473,346, which is a continuation-in-part of application No. 12/402,353, filed on Mar. 11, 2009.

(60) Provisional application No. 61/069,082, filed on Mar. 11, 2008.

(51) Int. Cl.
G06Q 30/00    (2012.01)
G06Q 30/02    (2012.01)

(52) U.S. Cl.
CPC ............ *G06Q 30/0243* (2013.01); *G06Q 30/02* (2013.01); *G06Q 30/0244* (2013.01); *G06Q 30/0277* (2013.01)

(58) Field of Classification Search
USPC ........................................... 705/14
See application file for complete search history.

(56) References Cited

U.S. PATENT DOCUMENTS 5,948,061 A    9/1999    Merriman et al.
6,108,703 A    8/2000    Leighton et al.
(Continued)

FOREIGN PATENT DOCUMENTS

CA    2673352    6/2009
WO    WO 00/58897    3/1999
(Continued)

OTHER PUBLICATIONS

PubMatic (Apr. 16, 2009). Predicting Ad Network Frequnecy Capping to Increase Publisher Rvenue; Retrieved from http://www.pubmatic.com/wp-content/uploads/2009/07/PubMatic.FrequencyOptimization.2009.pdf (Hereafter, Pubmatic).*
(Continued)

*Primary Examiner* — Eric Netzloff
(74) *Attorney, Agent, or Firm* — Knobbe, Martens, Olson & Bear LLP

(57) ABSTRACT

A system and method for optimizing advertisements. To maximize revenue, a plurality of ad networks are tiered based on their pricing data, and in one embodiment, their cost per thousand impressions (CPM). Each tier includes a pricing data range. Periodically, the system may increase and decrease frequency caps for the ad networks to adjust the ad networks in the tiers. Frequency caps may be increased for an ad network when the CPM for the ad network is above the CPM range for the ad network's tier. The frequency caps may be decreased for the ad network when the CPM for the ad network is below the CPM range for the ad network's tier. For each ad network request received, the system traverses through the tiers of the plurality of ad networks for an ad network that is capable of serving an ad based on the ad network's frequency cap.

17 Claims, 9 Drawing Sheets

(56) References Cited

U.S. PATENT DOCUMENTS

| | | |
|---|---|---|
| 6,285,987 B1 | 9/2001 | Roth et al. |
| 6,687,737 B2 | 2/2004 | Landsman et al. |
| 6,757,571 B1 | 6/2004 | Toyama |
| 6,763,148 B1 | 7/2004 | Sternberg et al. |
| 6,892,193 B2 | 5/2005 | Bolle et al. |
| 6,937,744 B1 | 8/2005 | Toyama |
| 6,954,783 B1 | 10/2005 | Bodwell et al. |
| 6,973,438 B1 | 12/2005 | Philyaw |
| 7,076,244 B2 | 7/2006 | Lazaridis et al. |
| 7,085,817 B1 | 8/2006 | Tock et al. |
| 7,406,498 B2 | 7/2008 | Reshef et al. |
| 7,475,404 B2 | 1/2009 | Hamel |
| 7,650,420 B2 | 1/2010 | Chong et al. |
| 7,882,046 B1 * | 2/2011 | Kizhakkekalathil et al. ... 706/12 |
| 8,472,728 B1 | 6/2013 | Chau et al. |
| 8,473,346 B2 * | 6/2013 | Mattern et al. ............. 705/14.43 |
| 8,554,683 B2 | 10/2013 | Knapp et al. |
| 8,831,987 B2 | 9/2014 | Knapp et al. |
| 2002/0161680 A1 | 10/2002 | Tarnoff |
| 2004/0054589 A1 | 3/2004 | Nicholas et al. |
| 2004/0103024 A1 | 5/2004 | Patel et al. |
| 2004/0117213 A1 | 6/2004 | Pache, Jr. et al. |
| 2004/0249709 A1 * | 12/2004 | Donovan et al. ................. 705/14 |
| 2005/0055271 A1 | 3/2005 | Axe et al. |
| 2005/0267798 A1 | 12/2005 | Panara |
| 2006/0026067 A1 | 2/2006 | Nicholas et al. |
| 2006/0212350 A1 | 9/2006 | Ellis et al. |
| 2006/0253578 A1 | 11/2006 | Dixon et al. |
| 2007/0038516 A1 | 2/2007 | Apple et al. |
| 2007/0067267 A1 | 3/2007 | Ives |
| 2007/0174118 A1 | 7/2007 | Dekel et al. |
| 2007/0174230 A1 | 7/2007 | Martin |
| 2007/0192194 A1 * | 8/2007 | O'Donnell et al. ............. 705/14 |
| 2007/0192356 A1 | 8/2007 | O'Kelley |
| 2007/0239532 A1 | 10/2007 | Benson et al. |
| 2007/0250301 A1 | 10/2007 | Vaisberg et al. |
| 2007/0255702 A1 | 11/2007 | Orme |
| 2007/0261112 A1 | 11/2007 | Todd et al. |
| 2008/0040225 A1 | 2/2008 | Roker |
| 2008/0040226 A1 | 2/2008 | Roker |
| 2008/0040302 A1 | 2/2008 | Perrizo |
| 2008/0140508 A1 | 6/2008 | Anand et al. |
| 2008/0270359 A1 | 10/2008 | Madhavan et al. |
| 2008/0281983 A1 | 11/2008 | Cooley et al. |
| 2009/0018907 A1 | 1/2009 | McCarthy et al. |
| 2009/0055267 A1 * | 2/2009 | Roker .............................. 705/14 |
| 2009/0234713 A1 | 9/2009 | Bi et al. |
| 2009/0327084 A1 | 12/2009 | Patton et al. |
| 2010/0106715 A1 | 4/2010 | Byun et al. |
| 2014/0172573 A1 | 6/2014 | Saurabh |

FOREIGN PATENT DOCUMENTS

| | | |
|---|---|---|
| WO | WO 2007/022137 | 2/2007 |
| WO | WO 2009/114634 | 9/2009 |

OTHER PUBLICATIONS

PubMatic (Apr. 16, 2009). Pubmatic New Technology Increased Publisher Revenu from Ad Network Frequency Capped Campaigns; Retrieved from http://www.pubmatic.com/04-16-2009).*

PubMatic (Apr. 16, 2009). Predicting Ad Network Frequency Capping to Increase Publisher Revenue; Retrieved from http://pubmatic.com/wp-content/uploads/2009/07/PubMatic.FrequencyOptimization.2009.pdf (Hereafter, Pubmatic).

PubMatic (Apr. 16, 2009). Pubmatic's New Technology Increases Publisher Revenue from Ad Network Frequency Capped Campaigns; Retrieved from http://www.pubmatic.com/04-16-2009.

U.S. Appl. No. 61/069,082, filed Nov. 11, 2008, Bi et al.

U.S. Appl. No. 61/197,942, filed Oct. 31, 2008, Williams et al.

Akamai Technologies, Inc., Fast Internet Technology with FreeFlow, Apr. 2000, Cambridge, MA.

Akamai Technologies, Inc., FreeFlow Flyer, 1999, Cambridge MA.

Cisco Systems, Inc., The Network Architecture Behind NetAid, 1999, pp. 1-17, San Jose, CA.

Doubleclick, Inc., Technical Specs for the DoubleClick Dart System, www.doubleclick.com, 1998.

Extended European Search Report for corresponding European Application 09718908.8.

Langheinrich, M., Unintrusive Customization Techniques for Web Advertising, May 1999, pp. 118, Proceedings of the Eighth International World Wide Web Conference, Canada.

Yardley, Greg "Rubicon Project: Initial Impressions," Feb. 23, 2008, pp. 1-4 XP002674792, retrieved frm the internet: http://yardley.ca/2008/02/23rubicon-prolect-initial-impressions/ (retrieved on Apr. 25, 2012).

* cited by examiner

| Ad Call | Revenue Science | Tribal Fusion | Blue Lithium | Ad.com | Burst | Google |
|---|---|---|---|---|---|---|
| 1 | 1.05 | .95 | .60 | .55 | .35 | .14 |
| 2 | .95 | .90 | .40 | .50 | .30 | .13 |
| 3 | .85 | .85 | Defaults | .40 | .20 | .12 |
| 4 | .70 | .75 | | .30 | .10 | .10 |
| 5 | .65 | .60 | | .20 | .05 | .09 |
| 6 | Defaults | .50 | | .10 | Defaults | .08 |
| Total CPM | .84 | .76 | .50 | .34 | .20 | .11 |

FIG. 2

| | Ad Size | Account | Ad Network | Ad Tag | Frequency | Impressions | Paid Impressions | Revenue | eCPM | rCPM | Fill Rate |
|---|---|---|---|---|---|---|---|---|---|---|---|
| 1 | Wide Skyscraper | Dicti LLC | Google | Google_160X600 | — | 14,526 | 12,146 | $13.17 | $1.08 | $0.91 | 84% |
| 2 | Wide Skyscraper | Dicti LLC | Context Web | ContextWeb_160 | — | 146,020 | 99,207 | $99.21 | $1.00 | $0.68 | 68% |
| 3 | Wide Skyscraper | Dicti LLC | Revenue Science | RevSci_160X600 | 7 per day | 59,714 | 24,727 | $26.38 | $1.07 | $0.44 | 41% |
| 4 | Wide Skyscraper | Dicti LLC | Burst Media | Burst_160X600 | 5 per day | 72,992 | 24,675 | $14.00 | $0.57 | $0.19 | 34% |
| 5 | Wide Skyscraper | Dicti LLC | Hispano Click | Hispano Click_160 | 3 per day | 52,900 | 46,618 | $21.74 | $0.47 | $0.41 | 88% |
| 6 | Wide Skyscraper | Dicti LLC | Specific Media | RUBICH_Specific | 3 per day | 23,548 | 20,446 | $12.20 | $0.60 | $0.52 | 87% |
| 7 | Wide Skyscraper | Dicti LLC | Value Click Media | Value Click_160X160 | 3 per day | 30,044 | 24,870 | $4.45 | $0.18 | $0.15 | 83% |
| 8 | Wide Skyscraper | Dicti LLC | Adconion | adconion_160_6 | 6 per day | 14,429 | 15,878 | $3.47 | $0.22 | $0.24 | 109% |
| 9 | Wide Skyscraper | Dicti LLC | 24/7 Real Media | 247_160_600 | 5 per day | 12,197 | 10,932 | $2.77 | $0.25 | $0.23 | 90% |
| 10 | Wide Skyscraper | Dicti LLC | Google | Google_160X600 | — | 97,079 | 92,270 | $9.88 | $0.11 | $0.10 | 95% |
| 11 | Wide Skyscraper | Dicti LLC | BlueLithium | Blue Lithium 160 | 5 per day | 12,057 | 8,153 | $6.01 | $0.74 | $0.50 | 68% |
| 12 | Wide Skyscraper | Dicti LLC | Casale Media | Casale_160X600 | 1 per day | 18,044 | 9,851 | $2.90 | $0.29 | $0.16 | 55% |
| 13 | Wide Skyscraper | Dicti LLC | Tribal Fusion | Tribal_Fusion_160 | 9 per day | 336,817 | 292,214 | $310.57 | $1.06 | $0.92 | 87% |

FIG. 3

| 502 | 504 | 506 | 508 | 510 | 512 | 514 | 516 | 518 | 520 | 522 | 524 | |
|---|---|---|---|---|---|---|---|---|---|---|---|---|
| Ad Size | Account | Network | Ad Tag | Frequency | US Weight | Impressions | Paid Impressions | Revenue | eCPM | rCPM | Fill Rate | |
| Wide Skyscraper | Didi LLC | Context Web | ContextWeb_16 | — | 999,999,999 | 146,020 | 99,207 | $99.21 | $1.00 | $0.68 | 68% | Tier 1 cpm range (1.08> 1.07) |
| Wide Skyscraper | Didi LLC | Google | Google_160X600 | — | 999,999,999 | 14,526 | 12,146 | $13.17 | $1.08 | $0.91 | 84% | 526 |
| Wide Skyscraper | Didi LLC | Tribal Fusion | Tribal_Fusion_16 | 9 per day | 999,999,999 | 336,817 | 292,214 | $310.57 | $1.06 | $0.92 | 87% | |
| Wide Skyscraper | Didi LLC | Revenue Science | RevSci_160X600 | 7 per day | 999,999,999 | 59,714 | 24,727 | $26.39 | $1.07 | $0.44 | 41% | |
| Wide Skyscraper | Didi LLC | Burst Media | Burst_160X600 | 5 per day | 100,000 | 72,952 | 24,675 | $14.00 | $0.57 | $0.19 | 34% | Tier 2 cpm range (.41> .57) |
| Wide Skyscraper | Didi LLC | Hispano Click | Hispano Click_16 | 3 per day | 100,000 | 52,300 | 46,618 | $21.74 | $0.47 | $0.41 | 88% | 528 |
| Wide Skyscraper | Didi LLC | Specific Media | RUBICN_Specific | 3 per day | 100,000 | 23,548 | 20,446 | $12.20 | $0.60 | $0.52 | 87% | |
| Wide Skyscraper | Didi LLC | 247 Real Media | 247_160_600 | 5 per day | 500 | 12,197 | 10,932 | $2.77 | $0.25 | $0.23 | 90% | Tier 3 cpm range (.18> .50) |
| Wide Skyscraper | Didi LLC | Adconion | adconion_160_6 | 6 per day | 500 | 14,429 | 15,678 | $3.47 | $0.22 | $0.24 | 109% | 530 |
| Wide Skyscraper | Didi LLC | BlueLithium | Blue Lithium 160 | 5 per day | 500 | 12,057 | 8,163 | $6.01 | $0.74 | $0.50 | 68% | |
| Wide Skyscraper | Didi LLC | Casale Media | Casale_160X600 | 1 per day | 500 | 18,044 | 9,851 | $2.99 | $0.29 | $0.16 | 55% | |
| Wide Skyscraper | Didi LLC | Value Click Media | Value Click_160X | 3 per day | 500 | 30,044 | 24,870 | $4.45 | $0.18 | $0.15 | 83% | |
| Wide Skyscraper | Didi LLC | Google | Google_160X600 | — | 1 | 97,079 | 92,270 | $9.88 | $0.11 | $0.10 | 95% | Tier 4 or Backfill is at .10 532 |

FIG. 5

| Ad Network | Ad Tag | Frequency Cap | Imps (Daily) | Paid Imps (Daily) | Revenue (Daily) | eCPM | rCPM | Fill Rate | oCPM | ± FCap |
|---|---|---|---|---|---|---|---|---|---|---|
| ⊞ 04. Tier 4 (5,800,000) | [2 Ad Tags] | | | | | | | | | |
| Dedicated Media (R) | RUBICH Dedicated 728x90 Tremor | 1 / day (child-open) | 590 | 525 | $0.52 | $1.00 | $0.89 | 89% | $0.89 | |
| Dedicated Media (R) | RUBICH Dedicated 728x90 RON_Jp | 1 / day (child-open) | 12,171 | 0 | $0.00 | $0.00 | $0.00 | 0% | $0.85 | |
| ⊞ 05. Tier 5 (8,830,000) | [1 Ad Tag] | | 12,761 | 525 | $0.52 | $0.00 | $0.11 | 11% | $0.85 | |
| Dedicated Media (R) | RUBICH Dedicated 728x90 ARCO | 2 / day (child-open) | 3 | 0 | $0.00 | $0.00 | $0.00 | 0% | $0.81 | |
| ⊞ 06. Tier 6 (119,000) | [1 Ad Tag] | | 3 | 0 | $0.00 | $0.00 | $0.00 | 0% | $0.81 | |
| Blue1.Brisen (P) | BL_728x90 | 1 / day (contractual) | 220,750 | 208,314 | $156.24 | $0.75 | $0.71 | 94% | $0.71 | Loosen |
| ⊞ 07. Tier 7 (17,000) | [25 Ad Tags] | | 220,750 | 208,314 | $156.24 | $0.75 | $0.71 | 94% | $0.71 | Loosen |
| Advertising.com (P) | Ad.com 728X90 | 2 / day (contractual) | 226,499 | 195,689 | $145.33 | $0.74 | $0.64 | 87% | $0.64 | Loosen |
| Advertising.com (P) | RUBICH Ad.com 728X90 Urbon(BH) | 1 / day (child-open) | 676 | 655 | $0.49 | $0.74 | $0.72 | 97% | $0.62 | |

FIG. 8

AD NETWORK OPTIMIZATION SYSTEM AND METHOD THEREOF

REFERENCE TO RELATED APPLICATIONS

This application is a Divisional application of co-pending U.S. patent application Ser. No. 12/552,274 titled AD NETWORK OPTIMIZATION SYSTEM AND METHOD THEREOF filed on Sep. 1, 2009, which is a Continuation-in-Part of U.S. patent application Ser. No. 12/402,353 titled AD MATCHING SYSTEM AND METHOD THEREOF filed on Mar. 11, 2009, which claims priority to U.S. Provisional Application Ser. No. 61/069,082 titled WEB PAGE AD MATCHING SYSTEM filed on Mar. 11, 2008, all of which are hereby incorporated by reference in their entirety, including, any appendices, screen shots, and references therein.

FIELD OF THE APPLICATION

The present application relates to advertisements, and more particularly, to increasing advertising revenue by assessing an ad network's performance against other ad networks in a multi-tiered system and adjusting the ad network's frequency cap based on that assessment in order to raise the ad network to a higher tier within the tiered system, wherein the higher the ad network in the tiered system the more likely the ad network will be used for ad calls.

BACKGROUND

Direct mail, newspaper, and television are slowly becoming the past for companies to build their brand name, public image, and to bring awareness to their new products. Nonetheless, the online advertising market has accelerating in recent years. Over $27 billion exchanged hands in 2007, and is expected to hit $147 billion by 2012. The most significant contributor to the online advertising market is the rapid influx of ad networks. As the amount of websites grow online and people using those websites increases, more ad networks are expected to emerge to serve as brokers for advertisers. Today, the online advertising market is an ever-expanding market fragmented by ad spending that has spread among 300+ disparate advertising networks worldwide including Google's AdSense, Yahoo!'s Publisher Network, HispanoClick, and Adtegrity. The abundance of these ad networks has created new challenges for websites trying to earn top dollar for unsold ad space.

Currently, ad networks allow website publishers to generate revenue by placing advertisements from the ad networks on their webpages. In many web applications and on many websites, advertisements are presented in the form of banners, graphic squares, text advertisements, video advertisements, pop-up and pop-under advertisements, Flash or other animated advertisements that move across the screen, etc. and displayed prominently on a web display, referred to as a "webpage." Users attracted to an advertisement often "click" on the advertisement by positioning a screen cursor on the advertisement and then depressing a button on a mouse or other input device. By clicking on the advertisement, a "hyperlink" to another website, associated with the advertisement and usually the home site of the advertiser, generates a path to the advertiser's designated page. Typically, the name of the path is presented to the user in the form of a uniform resource listing ("URL"), such as "ABC—Inc.com," followed by a directory path designating the particular page in the site that the advertiser wishes to be displayed, such as "/directory 13 name/page—name."

By establishing a relationship with an ad network, unsold advertisement inventory on a website can be sold such that both the webpage publisher and the ad network benefit. These ad networks also build relationships directly with advertisers who make ad purchases. Ad networks then seek to match the advertisers they have relationships with to publishers they have relationships with, thereby maximizing the amount of space they can sell.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect of the present application, an ad optimization platform is presented. The platform includes a database for storing information about a plurality of ad networks, wherein the information stored on the database includes frequency caps and pricing data for each ad network within the plurality of ad networks. In addition, the platform includes a data processing component having an executable component, which, when executed, the data processing component performs a plurality of processes. The processes can include associating each ad network of the plurality of ad networks to a tier based on the pricing data of the ad network, each tier having a pricing data range. Furthermore, the processes include, for each ad network within the plurality of ad networks, increasing the frequency cap for the ad network when the ad network's pricing data is above the price data range for its tier and decreasing the frequency cap for the ad network when the ad network's pricing data is below the price data range for its tier.

In accordance with another aspect of the present application, a system is presented. The system includes a web server hosting a website, wherein the website includes at least one page, the at least one page incorporating an ad tag and at least one ad impression. In addition, the system includes a user agent running a browser for rendering the at least one page from the web server, wherein the browser processes the ad tag within the at least one page causing requests for ad networks tags. Furthermore, the system includes an ad engine capable of receiving requests for ad network tags and in response, the ad engine provides ad network tags to the user agent, the ad network tags tiered by pricing data and adjusted using frequency caps, the user agent receiving the ad network tags and sending ad queries based on the ad network tags. The system also includes a plurality of ad networks each corresponding to the ad network tags and capable of receiving ad queries from the user agent, wherein each ad network within the plurality of ad networks serves an ad in response to the ad query from the user agent for the at least one ad impression within the at least one page.

In accordance with yet another aspect of the present application, an ad engine is presented. The ad engine includes a server connected to a network. The server includes at least one processor and a database for storing ad network information about a plurality of ad networks. The ad network information includes pricing data, frequency caps and ad network tags for each ad network within the plurality of ad networks. The ad network information is grouped within tiers according to each ad network's pricing data and each ad network is capable of changing tiers using its frequency cap. In addition, the server includes a memory operatively coupled to the processor, the memory storing program instructions which, when executed by the processor, causes the processor to execute several processes. These processes include receiving requests for ad network tags from user agents over the network. In addition, the processes include traversing through the tiers of ad network information to select ad networks tags. Furthermore, the processes include returning the selected ad network tags in response to the requests from the user agents.

In accordance with another aspect of the present application, a computer readable medium storing instructions for causing at least one processor to perform a method for maximizing advertisement revenues is presented. The method includes tiering a plurality of ad networks based on their cost per thousand impressions (CPM) with each tier having a CPM range, wherein each ad network corresponds to an ad network tag. In addition, the method includes periodically, increasing and decreasing frequency caps for the plurality of ad networks to raise the plurality of ad networks to a higher tier, wherein frequency caps are increased for an ad network when the CPM for the ad network is above the CPM range for the ad network's tier, the frequency caps decreased for the ad network when the CPM for the ad network is below the CPM range for the ad network's tier. Furthermore, the method includes periodically, re-tiering the plurality of ad networks based on their CPMs. For each ad network request received, the method includes traversing through the tiers of the plurality of ad networks for an ad network that is capable of serving an ad based on the ad network's frequency cap and returning an ad network tag corresponding to the ad network that is capable of serving the ad in response to the received request.

In accordance with still yet another aspect of the present application, a computer-implemented method for managing a plurality of ad networks so that optimal ads from the ad networks are provided to user agents is presented. The method includes receiving requests for ad network tags from the user agents and responding to the requests by serving ad network tags, wherein the ad network tags identify ad networks that serve ads and are tiered based on their pricing data. For received requests for ad network tags from the user agents, the method includes traversing through the ad network tags starting at a highest tier and going through each tier until an ad network is selected, wherein the ad network is selected when a frequency cap for the ad network has not been met. In addition, the method includes retrieving an ad network tag associated with the selected ad network and sending the ad network tag associated with the selected ad network in response to the received request for ad network information to the user agent.

In accordance with another aspect of the present application, in a user computer system having a display screen and a graphical user interface (GUI) supporting a browser, a method for maximizing advertisement revenue from a plurality of ad networks to fill ad impressions on a webpage generated by a host server and displayed by the browser supported on the GUI is presented. The method includes sending a request to the host server, wherein the host server serves a webpage in response to the request, the webpage incorporating standard markup language and an ad tag. In addition, the method includes processing the ad tag within the webpage causing requests for ad network information from an ad engine, wherein the ad engine stores information about the plurality of ad networks in tiers, the ad engine, in response, providing ad network tags. Furthermore, the method includes receiving the ad network tags from the ad engine, the ad network tags, when processed, cause a request for ads from ad networks referenced by the ad networks tags for each ad impression. Furthermore, the method includes displaying the standard markup language within the webpage from the host server and the ad for each ad impression through the browser supported on the GUI.

In accordance with another aspect of the present application, an engine for optimizing ad inventory is presented. The ad engine includes a data repository that stores information about a plurality of ad networks including pricing data and frequency caps for each ad network. In addition, the ad engine includes a tiering system that separates each of the plurality of ad networks into a set of tiers based on the pricing data of each ad network, each tier associated with a pricing data range. Furthermore, the ad engine includes an adjusting system that periodically adjusts frequency caps for each ad network within the plurality of ad networks, wherein the system increases the frequency cap for an ad network when the ad network's data pricing is above the pricing data range for its tier and the system decreases the frequency cap for an ad network when the ad network's data pricing is below the pricing data range for its tier. The ad engine also includes an ad network selection system that receives requests from user agents, wherein the ad network selection system traverses through the tiers of the plurality of ad networks, beginning at the top tier, until the system locates an ad network where the frequency cap for the ad network has not been met, the ad network selection system returning the ad network to the requesting user agents.

In accordance with another aspect of the present application, a host server is presented. The host server includes at least one processor, a database for storing at least one webpage, the at least one webpage having an ad tag and at least one ad impression, and a memory operatively coupled to the processor, the memory storing program instructions, that when executed by the processor, causes the processor to perform processes. The processes can include receiving a request for a webpage from a user agent, retrieving the webpage from the database, and sending the webpage to the user agent, wherein the user agent processes the webpage including the ad tag, the processing of the ad tag within the webpage causing the user agent to request ad network information from an ad engine that optimizes a plurality of ad networks.

In accordance with yet another aspect of the present application, an ad network is presented. The ad network includes a server connected to a network. The server includes at least one processor, a database for storing ads, and a memory operatively coupled to the processor, the memory storing program instructions that when executed by the processor, causes the processor to perform processes. These processes can include receiving a request for an ad from a user agent via the network, determining from within the database the ad to be given to the user agent based on the received request, and sending the determined ad to the user agent.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

FIG. 2 depicts exemplary pricing valuations for each ad call from multiple ad networks in accordance with one aspect of the present application;

FIG. 3 provides illustrative attributes for multiple ad networks in accordance with one aspect of the present application;

FIG. 5 shows a block diagram which separates the ad network information for the plurality of ad networks into tiers each having a tier range in accordance with one aspect of the present application;

FIG. 8 shows an illustrative block diagram whereby several opportunities for raising an ad network to a higher tier exists in accordance with one aspect of the present application.

DETAILED DESCRIPTION OF THE DRAWINGS

The detailed description set forth below in connection with the appended drawings is intended as a description of presently-preferred embodiments of the application and is not intended to represent the only forms in which the present application may be constructed and/or utilized. The description sets forth the functions and the sequence of steps for constructing and operating the application in connection with the illustrated embodiments. It is to be understood, however, that the same or equivalent functions and sequences may be accomplished by different embodiments that are also intended to be encompassed within the spirit and scope of this application.

System Overview

Figure 1:
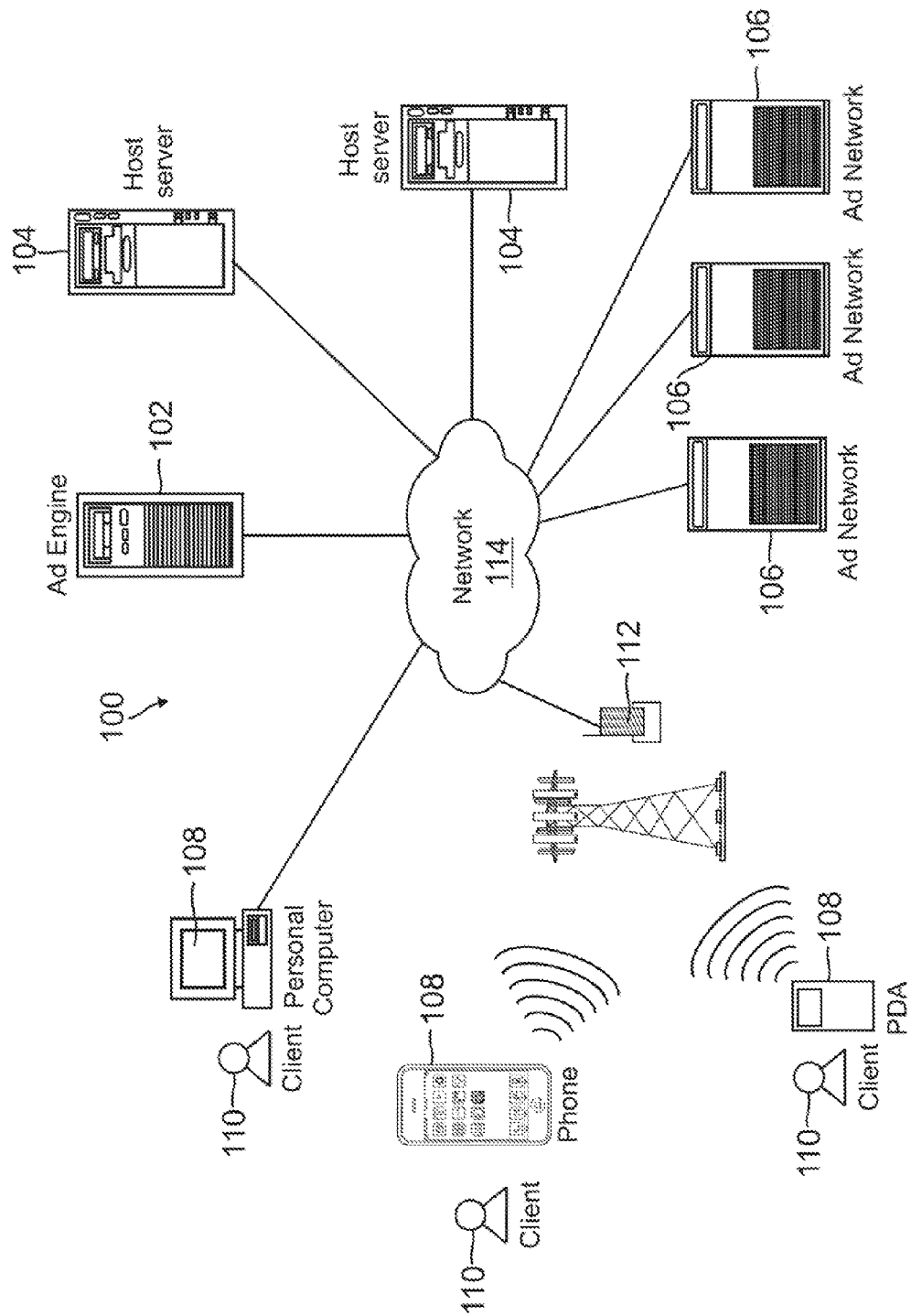
FIG. 1 illustrates an exemplary environment in which a user agent renders a webpage received from a host server along with advertisements from an ad network selected by an ad engine in accordance with one aspect of the present application.

FIG. 1 illustrates an exemplary environment 100 for an ad network optimization system. The system typically includes an ad engine 102, host servers 104, ad networks 106, user agents 108 operated by clients 110, wireless systems 114 capable of interacting with a set of user agents 108, and a network 114 coupling the system pieces together. Generally described, the present application relates to advertisements, and more particularly, to an ad engine 102, within the system, that selects a highest revenue generating advertisement opportunity from a plurality of ad networks 106 to be displayed on a user agent 108 to a client 110 on a webpage from a host server 104. In one illustrative embodiment, the ad engine 102 includes a database for storing information about a plurality of ad networks 106. The information stored on the database includes frequency caps and pricing data for each ad network 106 within the plurality of ad networks 106. The ad engine 102 also includes a data processing component having an executable component, which, when executed, performs a set of processes. The processes can include associating each ad network 106 of the plurality of ad networks 106 to a tier based on the pricing data of the ad network 106, with each tier having a pricing data range. For each ad network 106 within the plurality of ad networks 106, the ad engine 102 increases the frequency cap for the ad network 106 when the ad network's 106 pricing data is above the price data range for its tier. The ad engine decreases the frequency cap for the ad network 106 when the ad network's 106 pricing data is below the price data range for its tier. In essence, the system, and more specifically, the ad engine 102, optimizes information about ad networks 106 so that it can select the best ad network 106 to supply an ad on a user agent 108 to a client 110.

Definitions for terms used throughout this application are provided below. While the language defining the definitions are intended to enable one skilled in the relevant art to understand the complexity of the present application, the terms, as defined, should not be construed as limiting to its scope.

A user agent 108 is a device that helps a user or client 110 connect to a server. The user agent 108 can provide a program or task that requests a service provided by another program. Typically, the user agent 108 uses requested services provided by a server without having to "know" any working details about the other program or the service itself. On a local area network 114 or the Internet, a computer can be a user agent 108 that accesses shared network resources provided by another computer (called a server).

A browser is software that runs on a user agent 108 and allows the client 110 to view HTML documents and access files and software related to those documents. A browser, for purposes of this application, may also be referred to as a user agent 108.

Creatives refer to advertisements formatted in such a way that a web browser can display it properly. Creatives also refer to correlated content for an ad.

User agents 108 can be coupled to a network 114 through wireless systems 112. Wireless systems 112 refer or pertain to devices that communication without the use of interconnected wires or cables. Typically, communications are by radio, microwave, or infrared light. The Wireless Application Protocol (WAP) sets specifications for a global standard for enabling digital cellular phones and other wireless devices to access the network and other information services. Wireless communications refer to the communications between a computer and another computer or device without wires. The wireless system 112 is typically designed for wireless phones and handheld devices with small display screens, limited memory and slower data transmission speeds than a personal computer.

A wireless phone is a telephone that operates by means of radio waves without a wire connection. A base station is a cell tower that relays the phone's signals to a wireless carrier's network, where it is transmitted to another wireless phone or to a wired telephone network.

A server is a computer running administrative software that controls access to its resources, such as databases, printers and disk drives, and provides resources to user agents 108 that are capable of functioning as work stations. As represented in FIG. 1, servers can take the form of an ad engine 102, host servers 104, or ad networks 106. Servers are generally coupled to the internet or other network 114, and respond to commands from clients 110 operating user agents 108. In one example, a file server may contain archives of data or program files. When a user agent 108 submits a request for a file, the server can transfer a copy of the file to the user agent 108.

An ad network 106 is a company such as Google's AdSense, Yahoo!'s Publisher Network, HispanoClick, and Adtegrity. The ad network 106 connects websites that want to host advertisements with advertisers who want to run advertisements. Typically, ad networks 106 allow advertisements to be uploaded into their database so that the advertisements can be distributed when the ad network is called 106.

Ads from the ad networks 106 may come in a variety of forms including, but not limited to, banner ads, rich media, text links, and emails. Advertiser can buy a run of network package, or a run of category package within the network. The ad network 106 serves advertisements from its ad server, which responds to a site once a page is called. A snippet of code is called from the ad server that represents the advertising banner.

A host server 104 (content provider or publisher) provides services to user agents 108 that connect from remote locations. In one example, host server 104 can respond to requests from user agents 108 with a webpage. A webpage consists of hypertext markup language (HTML) and generally, associated files for graphics and scripts.

An ad engine 102, which will be described in more details later, optimizes advertisements from the plurality of ad networks 106, with the ad network distributing the advertisements to user agents 108. As shown, the ad engine 102 may be connected remotely from the plurality of ad networks 106 or in the alternative, directly.

A network 114, as provided in the environment 100 of FIG. 1, can connect the servers and user agents 108 together. Normally, the network 114 is in the form of the Internet. The Internet is a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. One or more Internet nodes can go off line without endangering the Internet as a whole or causing communications on the Internet to stop, because no single computer or network controls it.

While several components have been described herein, one skilled in the relevant art will appreciate that multiple configurations of the system can be implemented and the environment 100 of FIG. 1 is used for illustrative purposes. Environment 100 should not be construed as limiting to the scope of this application and those skilled in the art will appreciate that fewer or more pieces may be subtracted or added to the environment 100.

In accordance with one aspect of the present application, an ad engine 102 that optimizes open frequency capped tags corresponding to a plurality of ad networks 106 by assessing their current performance against other relevant ad networks 106 and adjusting their frequency caps is presented.

In accordance with another aspect of the present application, an ad engine 102 that connects content providers (host servers 104) with ad networks 106 in ways that benefit the content providers, ad networks 106, advertisers and clients 110 alike is presented. The ad engine 102 optimizes ad inventory decisions for the content providers by identifying and recommending an ad network 106 that will generate the most revenue in real time. This results in increased revenues for the content providers while at the same time freeing them so that they may focus on generating innovative content and reaching new readers.

In accordance with yet another aspect of the present application, an ad engine 102 that removes the limitation of dealing with only a single ad network 106 is presented. Ad engine 102 is capable of providing ad network tags corresponding to a plurality of ad networks 106. Furthermore, ad engine 102 manages and monetizes ad inventory from the plurality of ad networks 106. Ad engine 102 can select appropriate advertisements based on particular verticals, geographies, or targeting technologies. The ad engine 102 automatically identifies which ad network 106 can best monetize the content provider's ad on a per-impression basis yielding higher revenues for publishers.

In accordance with another aspect of the present application, an automated technological solution for adjusting frequency caps automatically is presented. The frequency cap controls the number of times an ad tag can be served to an individual user agent 108. Typically, this is based on a twenty-four time frame. By altering the frequency cap, the results have been shown to improve the overall revenue.

In accordance with one aspect of the present application, an ad optimization platform 102 is presented. The platform 102 includes a database for storing information about a plurality of ad networks 106, wherein the information stored on the database includes frequency caps and pricing data for each ad network 106 within the plurality of ad networks 106. In addition, the platform includes a data processing component having an executable component, which, when executed, the data processing component performs a plurality of processes. The processes can include associating each ad network 106 of the plurality of ad networks 106 to a tier based on the pricing data of the ad network 106, each tier having a pricing data range. Furthermore, the processes include, for each ad network within the plurality of ad networks, increasing the frequency cap for the ad network 106 when the ad network's pricing data is above the price data range for its tier and decreasing the frequency cap for the ad network 106 when the ad network's pricing data is below the price data range for its tier.

The frequency caps can be classified as open or contracted. In addition, the frequency caps can be increased or decreased when open. The pricing data can be measured by a cost per thousand impressions (CPM). The pricing data can be measured by an effective cost per thousand impressions (eCPM). The pricing data can be measured by a real cost per thousand impressions (rCPM). The pricing data can be dynamically updated.

The plurality of ad networks 106 can be tiered by ranking the plurality of ad networks 106 according to pricing data and determining tiers and divides between the ranked plurality of ad networks 106, based on the determination, defining the price data range for each tier, and raising or lowering those ad networks 106 falling within the divides. Weights can be applied to each ad network 106 after they have been tiered.

In accordance with another aspect of the present application, a system is presented. The system includes a web server 104 hosting a website, wherein the website includes at least one page, the at least one page incorporating an ad tag and at least one ad impression. In addition, the system includes a user agent 108 running a browser for rendering the at least one page from the web server 104, wherein the browser processes the ad tag within the at least one page causing requests for ad networks tags. Furthermore, the system includes an ad engine 102 capable of receiving requests for ad network tags and in response, the ad engine 102 provides ad network tags to the user agent, the ad network tags tiered by pricing data and adjusted using frequency caps, the user agent receiving the ad network tags and sending ad queries based on the ad network tags. The system also includes a plurality of ad networks 106 each corresponding to the ad network tags and capable of receiving ad queries from the user agent 108, wherein each ad network 106 within the plurality of ad networks 106 serves an ad in response to the ad query from the user agent 108 for the at least one ad impression within the at least one page.

In accordance with yet another aspect of the present application, an ad engine 102 is presented. The ad engine 102 includes a server connected to a network 114. The server includes at least one processor and a database for storing ad network information about a plurality of ad networks 106. The ad network information includes pricing data, frequency caps and ad network tags for each ad network 106 within the plurality of ad networks 106. The ad network information is grouped within tiers according to each ad network's pricing data and each ad network 106 is capable of changing tiers using its frequency cap. In addition, the server includes a memory operatively coupled to the processor, the memory storing program instructions which, when executed by the processor, causes the processor to execute several processes. These processes include receiving requests for ad network tags from user agents 108 over the network 114. In addition, the processes include traversing through the tiers of ad network information to select ad networks tags. Furthermore, the processes include returning the selected ad network tags in response to the requests from the user agents 108.

Traversing through the tiered ad network information to select ad networks 106 includes searching at the highest tier within the tiered network information for an ad network 106 that is capable of serving an ad based on the ad network's frequency cap within the tier and searching through a next lower tier if an ad network 106 cannot be found. Traversing through the tiered ad network information to select ad networks further includes returning to the highest tier if there is no lower tier. The tiered ad network information is separated into tiers by pricing data ranges.

The ad engine 102 can also increase the frequency cap for each ad network 106 when its pricing data is above the price data range for its tier and decrease the frequency cap for each ad network 106 when its pricing data is below the price data range for its tier. The ad engine 102 can increase and decrease the frequency cap for each ad network 106 periodically. Periodically can be hourly, daily or weekly.

In accordance with another aspect of the present application, a computer readable medium storing instructions for causing at least one processor to perform a method for maximizing advertisement revenues is presented. The method includes tiering a plurality of ad networks 106 based on their cost per thousand impressions (CPM) with each tier having a CPM range, wherein each ad network 106 corresponds to an ad network tag. In addition, the method includes periodically, increasing and decreasing frequency caps for the plurality of ad networks 106 to raise the plurality of ad networks 106 to a higher tier, wherein frequency caps are increased for an ad network 106 when the CPM for the ad network 106 is above the CPM range for the ad network's tier, the frequency caps decreased for the ad network 106 when the CPM for the ad network 106 is below the CPM range for the ad network's tier. Furthermore, the method includes periodically, re-tiering the plurality of ad networks 106 based on their CPMs. For each ad network 106 request received, the method includes traversing through the tiers of the plurality of ad networks 106 for an ad network 106 that is capable of serving an ad based on the ad network's frequency cap and returning an ad network tag corresponding to the ad network 106 that is capable of serving the ad in response to the received request.

Increasing frequency caps allows for more impressions to be filled by the ad network 106 possibly raising the ad network 106 to the higher tier. Decreasing frequency caps allows for fewer impressions to be filled by the ad network 106 possibly raising the ad network 106 to the higher tier.

The method can include adding a new ad network 106 into the tiers, wherein the new ad network 106 performs no less than a lowest performing ad network 106 within the tier. The method can also include tiering the plurality of ad networks 106 based on their CPMs and separated by a ten percent differential between the tiers.

The plurality of ad networks 106 can be tiered by their effective cost per thousand impressions (eCPM). The plurality of ad networks 106 can be tiered by their real cost per thousand impressions (rCPM). The plurality of ad networks 106 can be tiered by their optimized cost per thousand impressions (oCPM). Each ad network 106 is capable of serving an ad until their frequency cap is met.

In accordance with still yet another aspect of the present application, a computer-implemented method for managing a plurality of ad networks 106 so that optimal ads from the ad networks 106 are provided to user agents 108 is presented. The method includes receiving requests for ad network tags from the user agents 108 and responding to the requests by serving ad network tags, wherein the ad network tags identify ad networks 106 that serve ads and are tiered based on their pricing data. For received requests for ad network tags from the user agents 108, the method includes traversing through the ad network tags starting at a highest tier and going through each tier until an ad network 106 is selected, wherein the ad network 106 is selected when a frequency cap for the ad network has not been met. In addition, the method includes retrieving an ad network tag associated with the selected ad network 106 and sending the ad network tag associated with the selected ad network 106 in response to the received request for ad network information to the user agent 108.

The frequency cap can be updated after the ad network 106 has been selected for managing the plurality of ad networks 106. The ad network tags tiered by their CPM can be sorted from highest CPM to lowest CPM within each tier. The tiers can vary from country to country. The ad networks 106 can be tiered into five tiers. Traversing through the ad network tags can be restarted after a period of time.

In accordance with another aspect of the present application, in a user computer system having a display screen and a graphical user interface (GUI) supporting a browser, a method for maximizing advertisement revenue from a plurality of ad networks to fill ad impressions on a webpage generated by a host server and displayed by the browser supported on the GUI is presented. The method includes sending a request to the host server, wherein the host server serves a webpage in response to the request, the webpage incorporating standard markup language and an ad tag. In addition, the method includes processing the ad tag within the webpage causing requests for ad network information from an ad engine, wherein the ad engine stores information about the plurality of ad networks in tiers, the ad engine, in response, providing ad network tags. Furthermore, the method includes receiving the ad network tags from the ad engine, the ad network tags, when processed, cause a request for ads from ad networks referenced by the ad networks tags for each ad impression. Furthermore, the method includes displaying the standard markup language within the webpage from the host server and the ad for each ad impression through the browser supported on the GUI.

In accordance with another aspect of the present application, an engine 102 for optimizing ad inventory is presented. The ad engine 102 includes a data repository that stores information about a plurality of ad networks 106 including pricing data and frequency caps for each ad network 106. In addition, the ad engine 102 includes a tiering system that separates each of the plurality of ad networks 106 into a set of tiers based on the pricing data of each ad network 106, each tier associated with a pricing data range. Furthermore, the ad engine 102 includes an adjusting system that periodically adjusts frequency caps for each ad network 106 within the plurality of ad networks 106, wherein the system increases the frequency cap for an ad network 106 when the ad network's data pricing is above the pricing data range for its tier and the system decreases the frequency cap for an ad network 106 when the ad network's data pricing is below the pricing data range for its tier. The ad engine 102 also includes an ad network selection system that receives requests from user agents 108, wherein the ad network selection system traverses through the tiers of the plurality of ad networks, beginning at the top tier, until the system locates an ad network 106 where the frequency cap for the ad network 106 has not been met, the ad network selection system returning the ad network 106 to the requesting user agents 108.

In accordance with another aspect of the present application, a host server 104 is presented. The host server 104 includes at least one processor, a database for storing at least one webpage, the at least one webpage having an ad tag and at least one ad impression, and a memory operatively coupled to the processor, the memory storing program instructions that when executed by the processor, causes the processor to execute processes. These processes include receiving a request for a webpage from a user agent 108, retrieving the webpage from the database, and sending the webpage to the user agent 108, wherein the user agent 108 processes the webpage including the ad tag, the processing of the ad tag within the webpage causing the user agent 108 to request ad network information from an ad engine 102 that optimizes a plurality of ad networks 106.

In accordance with still yet another aspect of the present application, an ad network 106 is presented. The ad network 106 includes a server connected to a network 114. The server further includes at least one processor, a database for storing ads, and a memory operatively coupled to the processor, the memory storing program instructions that when executed by the processor, causes the processor to execute processes. The processes include receiving a request for an ad from a user agent 108 via the network 114, determining from within the database the ad to be given to the user agent 108 based on the received request, and sending the determined ad to the user agent 108.

Advertising Price Valuations

FIG. 2 depicts an exemplary pricing chart 200 showing revenue generated when an ad from a particular ad network 106 is distributed. Revenue can be calculated based on CPM. CPM stands for cost per mille impressions and is a commonly used measurement in advertising that refers to what it would cost the ad network 106 to show an ad to one thousand viewers. It is used to calculate the relative cost of an advertising campaign or an ad message. Rather than an absolute cost, CPM estimates the cost per one thousand views of the ad.

As shown, CPMs can be calculated by taking the revenue generated for each ad call and averaging the sum of the total revenue. For example, Ad Network Revenue Science 202, generates $1.05 for the first ad call, $0.95 for the second ad call, $0.85 for the third ad call, $0.70 for the fourth ad call, and $0.65 for the fifth ad call. Any ad called after the fifth ad call would be a default ad as depicted. After taking the total revenue for the ad calls and dividing it by the number of ad calls, a CPM of $0.84 for Ad Network Revenue Science 202 is obtained.

In another illustration, Ad Network Tribal Fusion 204 generates $0.95 for the first ad call, $0.90 for the second ad call, $0.85 for the third ad call, $0.75 for the fourth ad call, $0.60 for the fifth ad call, and $0.50 for the sixth ad call. Any ad called after the sixth ad call would be a default ad. After taking the total revenue for the ad calls and dividing it by the number of ad calls, a CPM of $0.76 for Ad Network Tribal Fusion 204 is obtained.

Ad Network Blue Lithium 206 generates $0.60 for the first ad call and $0.40 for the second ad call. Any ad called after the third ad call would be a default ad. After taking the total revenue for the ad calls and dividing it by the number of ad calls, a CPM of $0.50 for Ad Network Blue Lithium 206 is obtained.

Ad Network Ad.com 208 generates $0.55 for the first ad call, $0.50 for the second ad call, $0.40 for the third ad call, $0.30 for the fourth ad call, $0.20 for the fifth ad call, and $0.10 for the sixth ad call. Any ad called after the sixth ad call would be a default ad. After taking the total revenue for the ad calls and dividing it by the number of ad calls, a CPM of $0.34 for Ad Network Ad.com 208 is obtained.

Ad Network Burst 210 generates $0.35 for the first ad call, $0.30 for the second ad call, $0.20 for the third ad call, $0.10 for the fourth ad call, and $0.05 for the fifth ad call. Any ad called after the fifth ad call would be a default ad. After taking the total revenue for the ad calls and dividing it by the number of ad calls, a CPM of $0.20 for Ad Network Burst 210 is obtained.

Ad Network Google 212 generates $0.14 for the first ad call, $0.13 for the second ad call, $0.12 for the third ad call, $0.10 for the fourth ad call, $0.09 for the fifth ad call, and $0.08 for the sixth ad call. Any ad called after the sixth ad call would be a default ad. After taking the total revenue for the ad calls and dividing it by the number of ad calls, a CPM of $0.11 for Ad Network Google 212 is obtained.

Generally, ad calls refer to requests from a specific ad network 106. Each ad network 106 can be associated with a plurality of advertisers. Advertisements within each call may vary dependent on the ad network 106. As will be shown below, the number of ad calls depends on the frequency cap associated with the ad network 106. The frequency cap limits the number of times an ad network 106 may be called by a user per a specified time period, which is usually a twenty-four hour time period.

In one embodiment, ad networks 106 do not distribute the same advertisements. Alternatively, and more commonly, the ad networks 106 provided within chart 200 can distribute the same advertisements. Differences between the ad networks 106 in these embodiments would only be the revenue provided by the ad networks 106 for each ad called. For example, on the first ad call to Ad Network Google 212, an advertisement for a vacation deal would be provided at $0.14 CPM. That same advertisement can be distributed by Ad Network Revenue Science 202 on its fourth ad call at $0.70 CPM. Thus, an additional revenue of $0.56 CPM can be provided by retrieving an ad from Ad Network Revenue Science 202 instead of Ad Network Google 212.

Ads may come in a variety of forms, sizes, shapes, etc. Floating ads move across a user's browser (user agent 108) or floats above the content provided by the host server 104. Expanding ads change size and may alter the contents of the webpage provided by the host server 104. Polite ads are those ads which are downloaded in small pieces to minimize the disruption of the content being viewed by the client 110 on the user agent 108. A wallpaper ad is an ad which changes the background of the webpage being viewed.

In addition, a trick banner is an ad that looks like dialog box buttons. Pop-up ads are ads that are displayed in a new window which opens in front of the current window to display an advertisement. Generally these appear as separate webpages or boxes. Pop-under ads are similar to pop-up ads except that the window is loaded or sent behind the current window so that client 110 does not see it until they close one or more active windows.

Video ads are similar to banner ads, except that instead of a static or animated image, actual moving video clips are displayed. Map ads are text or graphics linked from, and appearing in or over, a location on an electronic map such as on Google Maps. Mobile ads are SMS text or a multi-media message sent to a cell phone.

While advertising revenue was calculated above in terms of CPM, revenue can be calculated through many other ways. Cost Per Visitor (CPV) is where advertisers pay for the delivery of a targeted client 110 to the advertiser's website. To keep accurate information about the visit, ad engine 102 in combination with user agent 108 would keep track of whether the website was visited. Cost Per Click (CPC), also known as Pay Per Click (PPC) is where advertisers pay each time a client 110 clicks on their listing on their user agent 108 and is redirected to their website. Advertisers do not actually, pay for the listing, but only when the listing is clicked on.

Cost Per Action (CPA) is where the publisher takes the risk of running the ad, and the advertiser pays only for the amount of clients 110 who complete a transaction, such as a purchase or sign-up. Cost Per Lead (CPL) is based on the client 110 completing a form, registering for a newsletter or some other action that the merchant feels will lead to a sale. Cost Per Order (CPO) is based on each time an order is transacted. Cost Per Engagement (CPE) is where advertisers pay only when a client 110 engages with their specific ad unit. Engagement is defined as a client 110 interacting with an ad in any number of ways.

Only six ad networks 106 were shown within the exemplary chart 200 of FIG. 2. One skilled in the relevant art will appreciate that any number of ad networks 106 may be part of the system described herein. Generally, the ad networks 106 are approved by an administrator.

As will be described below, based on the CPM or other relevant pricing data, ad engine 102 will pick the best ads from each ad network 106. Through a tiered approach, the ad engine 102 avoids using one ad network 106 exclusively. In one illustration to the benefits of using ad engine 102, and shown in FIG. 2, taking the first four ad calls from Ad Network Revenue Science 106 will yield a CPM of $0.88. However, in the optimized tiered system, a CPM of $0.96 can be obtained. As such, the system could use ad call 1 from Ad Network Revenue Science 202 having a CPM of $1.05, ad call 2 from Ad Network Revenue Science 202 having a CPM of $0.95, ad call 1 from Ad Network Tribal Fusion 204 having a CPM of $0.95, and ad call 2 from Ad Network Tribal Fusion 204 having a CPM of $0.90 to generate the $0.96 CPM.

With reference now to FIG. 3, a chart 300 providing illustrative attributes for multiple ad networks 106 is presented. As shown, generally each ad network 106 has several attributes, including but not limited to, ad size 302, account 304, ad network 306, ad tag 308, frequency 310, impressions 312, paid impressions 314, revenue 316, effective cost per mille impressions (eCPM) 318, real cost per mine impressions (rCPM) 320, and fill rate 322.

Ad size 302 refers to a set of standardized ad widths (in pixels) and lengths (in pixels). For example, the "Wide Skyscraper" ad size 302, as shown in FIG. 3, refers to an ad having 160×600 pixels. Other types of ad sizes 302 can include "Large Rectangle" (336×280), "Medium Rectangle" (300× 250), "Square Pop-Up" (250×250), "Vertical Rectangle" (240×400), "Rectangle" (180×150), "Leaderboard" (728×90), "Full Banner" (468×60), "Half Banner" (234×60), "Button 1" (120×90), "Button 2" (120×60), "Micro Bar" (88×15), "Micro Button" (80×15), "Vertical Banner" (120× 240), "Square Button" (125×125), "Skyscraper" (120×600), and "Half-Page" (300×600).

Account 304 can refer to the host server 104 or publisher who ad engine 102 has partnered with to provide advertisements for. As shown, "Dicti LLC" is the host server 104 or publisher who has generated webpages, those webpages having ad impressions for ad engine 102 to fill. While FIG. 3 shows only one account 304, it is provided for illustrative purposes only and should not be construed as limiting to the scope of this application.

Ad network 306 refers to the network 106 which supplies ads. Ad networks 106 can supply many ads by partnering with a set of advertisers. Ad networks 106, can include "Google", "Context Web", "Revenue Science", "Burst Media", "Hispano Click", "Specific Media", "Value Click Media", "Adconion", "24/7 Real Media", "BlueLithium", "Casale Media", and "Tribal Fusion", to name a few.

Ad tag 308 can refer to the specific code that is provided to a user agent 108 when an ad is requested from a particular ad network 106. For example, the Ad Tag 308 for an ad requested from Ad Network Google 106 can be "Google_160×600".

Frequency 310 refers to frequency caps set by the ad network 106, ad engine 102, or both. Frequency cap is the amount of times a specific user agent 108 is shown a particular advertisement. Frequency capping is often cited as a way to avoid banner burnout, the point where clients 110 are being overexposed and response drops. This may be true for campaigns of a direct-response nature measured by click-throughs, but it might run counter to campaigns of a brand-building nature measured by non-click activity.

Frequency caps can be contractual or open. Contractual frequency caps are non-adjustable and usually associated with straight CPM based deals. In one example, DrivePM, an ad network 106, will pay USA Today, a host server 104 or publisher, a flat $0.80 CPM and cap the deal to two ads per user per twenty-four hour basis.

Alternatively, open frequency caps are adjustable and usually associated with revenue sharing deals. In one example, Ad Network Burst Media 106 can provide a $0.60 CPM and have a frequency cap of two ads per user per twenty-four hour basis. This, however, can be adjusted to any number that is desired, which typically takes place on ad engine 102.

Still yet, when blank spots, such as "_____", appear, there are generally an unlimited number of advertisements and the ad network 106 is not capped.

Impressions 312 can refer to the number of times that the advertisement has been displayed. Typically, this does not refer to the same advertisement, but refers to a set of advertisements having the same attributes. Paid impressions 314 can refer to the number of times that the advertisement has been displayed and the advertisement was a paying advertisement.

Revenue 316 is the total amount paid by the ad network 106 for that particular type of ad. Beforehand, CPM was described as a way to calculate revenue. In addition, the effective cost per mille impressions (eCPM) 316 and the real cost per mille impressions (rCPM) 318 can also be used. eCPM can be calculated by:

$$\frac{\text{Revenue}}{\text{Paid Impressions}} \times 1000 = rCPM$$

rCPM 318 can be calculated by:

$$\frac{\text{Revenue}}{\text{Impressions}} \times 1000 = eCPM$$

As will be shown below, ad networks 106 can be optimized based on these pricing valuations.

Fill Rate 322 can refer to the percentage of advertisements that are actually paid impressions. Fill Rate 322 is calculated by:

$$\frac{\text{Paid Impressions}}{\text{Impressions}} = \text{Fill Rate}$$

Continuing with FIG. 3, the attributes for each ad network 106 within chart 300 will now be described. The attributes provided herein are for illustrative purposes only and should not be construed as limiting to the scope of the present application. The ad network 106 of row 1 for chart 300 has attributes that include:
 Ad Size 302: "Wide Skyscraper";
 Account 304: "Dicti LLC";
 Ad Network 306: "Google";
 Ad Tag 308 "Google__160×600";
 Frequency 310: "_____";
 Impressions 312: 14,526;
 Paid Impressions 314: 12,146;
 Revenue 316: $13.17;
 eCPM 318: $1.08;
 rCPM 320: $0.91; and
 Fill Rate 322 84%.

The ad network 106 of row 2 for chart 300 has attributes that include:
 Ad Size 302: "Wide Skyscraper";
 Account 304: "Dicti LLC";
 Ad Network 306: "Context Web";
 Ad Tag 308: "ContextWeb__16";
 Frequency 310: "_____";
 Impressions 312: 146,020;
 Paid Impressions: 314 99,207;
 Revenue 316: $99.21;
 eCPM 318: $1.00;
 rCPM 320: $0.68; and
 Fill Rate 322: 68%.

The ad network 106 of row 3 for chart 300 has attributes that include:
 Ad Size 302: of "Wide Skyscraper";
 Account 304: "Dicti LLC";
 Ad Network 306: "Revenue Science";
 Ad Tag 308: "RevSci__160×600";
 Frequency 310: "7 per day";
 Impressions 312: 59,714;
 Paid Impressions 314: 24,727;
 Revenue 316: $26.38;
 eCPM 318: $1.07;
 rCPM 320: $0.44; and
 Fill Rate 322: 41%.

The ad network 106 of row 4 for chart 300 has attributes that include:
 Ad Size 302: "Wide Skyscraper";
 Account 304: "Dicti LLC";
 Ad Network 306: "Burst Media";
 Ad Tag 308: "Burst__160×600";
 Frequency 310: "5 per day";
 Impressions 312: 72,992;
 Paid Impressions 314: 24,675;
 Revenue 316: $14.00;
 eCPM 318: $0.57;
 rCPM 320: $0.19; and
 Fill Rate 322: 34%.

The ad network 106 of row 5 for chart 300 has attributes that include:
 Ad Size 302: "Wide Skyscraper";
 Account 304: "Dicti LLC";
 Ad Network 306: "Hispano Click";
 Ad Tag 308: "Hispano Click__16";
 Frequency 310: "3 per day";
 Impressions 312: 52,900;
 Paid Impressions 314: 46,618;
 Revenue 316: $21.74;
 eCPM 318: $0.47;
 rCPM 320: $0.41; and
 Fill Rate 322: 88%.

The ad network 106 of row 6 for chart 300 has attributes that include:
 Ad Size 302: "Wide Skyscraper";
 Account 304: "Dicti LLC";
 Ad Network 306: "Specific Media";
 Ad Tag 308: "RUBICH_Specific";
 Frequency 310: "3 per day";
 Impressions 312: 23,548;
 Paid Impressions 314: 20,446;
 Revenue 316: $12.20;
 eCPM 318: $0.60;
 rCPM 320: $0.52; and
 Fill Rate 322: 87%.

The ad network 106 of row 7 for chart 300 has attributes that include:
 Ad Size 302: "Wide Skyscraper";
 Account 304: "Dicti LLC";
 Ad Network 306: "Value Click Media";
 Ad Tag 308: Value Click__160×";
 Frequency 310: "3 per day";
 Impressions 312: 30,044;
 Paid Impressions 314: 24,870;
 Revenue 316: $4.45;
 eCPM 318: $0.18;
 rCPM 320: $0.15; and
 Fill Rate 322: 83%.

The ad network 106 of row 8 for chart 300 has attributes that include:
 Ad Size 302: "Wide Skyscraper";
 Account 304: "Dicti LLC";
 Ad Network 306: "Adconion";
 Ad Tag 308: "adconion__160__6";
 Frequency 310: "6 per day";
 Impressions 312: 14,429;
 Paid Impressions 314: 15,678;
 Revenue 316: $3.47;
 eCPM 318: $0.22;
 rCPM 320: $0.24; and
 Fill Rate 322: 109%.

The ad network 106 of row 9 for chart 300 has attributes that include:
 Ad Size 302: "Wide Skyscraper";
 Account 304: "Dicti LLC";

Ad Network 306: "24/7 Real Media";
Ad Tag 308: 247_160_600";
Frequency 310: "5 per day";
Impressions 312: 12,197;
Paid Impressions 314: 10,932;
Revenue 316: $2.77;
eCPM 318: $0.25;
rCPM 320: $0.23; and
Fill Rate 322: 90%.

The ad network 106 of row 10 for chart 300 has attributes that include:
Ad Size 302: "Wide Skyscraper";
Account 304: "Dicti LLC";
Ad Network 306: "Google";
Ad Tag 308: Google_160×600";
Frequency 310: "_____";
Impressions 312: 97,079;
Paid Impressions 314: 92,270;
Revenue 316: $9.88;
eCPM 318: $0.11;
rCPM 320: $0.10; and
Fill Rate 322: 95%.

The ad network 106 of row 11 for chart 300 has attributes that include:
Ad Size 302: "Wide Skyscraper";
Account 304: "Dicti LLC";
Ad Network 306: "BlueLithium";
Ad Tag 308: "Blue Lithium 160;
Frequency 310: "5 per day";
Impressions 312: 12,057;
Paid Impressions 314: 8,163;
Revenue 316: $6.01;
eCPM 318: $0.74;
rCPM 320: $0.50; and
Fill Rate 322: 68%.

The ad network 106 of row 12 for chart 300 has attributes that include:
Ad Size 302: "Wide Skyscraper";
Account 304: "Dicti LLC";
Ad Network 306: "Casale Media";
Ad Tag 308: "Casale160×600";
Frequency 310: "1 per day";
Impressions 312: 18,044;
Paid Impressions 314: 9,851;
Revenue 316: $2.90;
eCPM 318: $0.29;
rCPM 320: $0.16; and
Fill Rate 322: 55%.

The ad network 106 of row 13 for chart 300 has attributes that include:
Ad Size 302: "Wide Skyscraper";
Account 304: "Dicti LLC";
Ad Network 306: "Tribal Fusion";
Ad Tag 308: "Tribal_Fusion_16";
Frequency 310: "9 per day";
Impressions 312: 336,817;
Paid Impressions 314: 292,214;
Revenue 316: $310.57;
eCPM 318: $1.06;
rCPM 320: $0.92; and
Fill Rate 322: 87%.

Methods of Operation

As shown in FIG. 3, each of the rows of chart 300 are disorganized and are of little use when unsorted. The present application relates to increasing the performance of selecting an ad network 106 and distributing the ad network tag corresponding to the selected ad network to a user agent 108 by using ad engine 102. This includes (1) tiering the information related to the ad networks 106; (2) traversing through the tiered information; (3) receiving individual requests from user agents 108 and responding to those requests; and (4) adjusting frequency caps for the ad networks 106 so that the higher performing ad networks 106 may be placed into higher performing tiers as for many impressions as possible. Through these methods of operation, the performance of ad engine 102 is increased and allows for more network opportunities. The only qualification is that a new ad network 106 performs no less than the lowest performing network 106 in a tier. Generally, all ad networks 106 belonging to a tier have a frequency cap with few exceptions to the rule.

Figure 4:
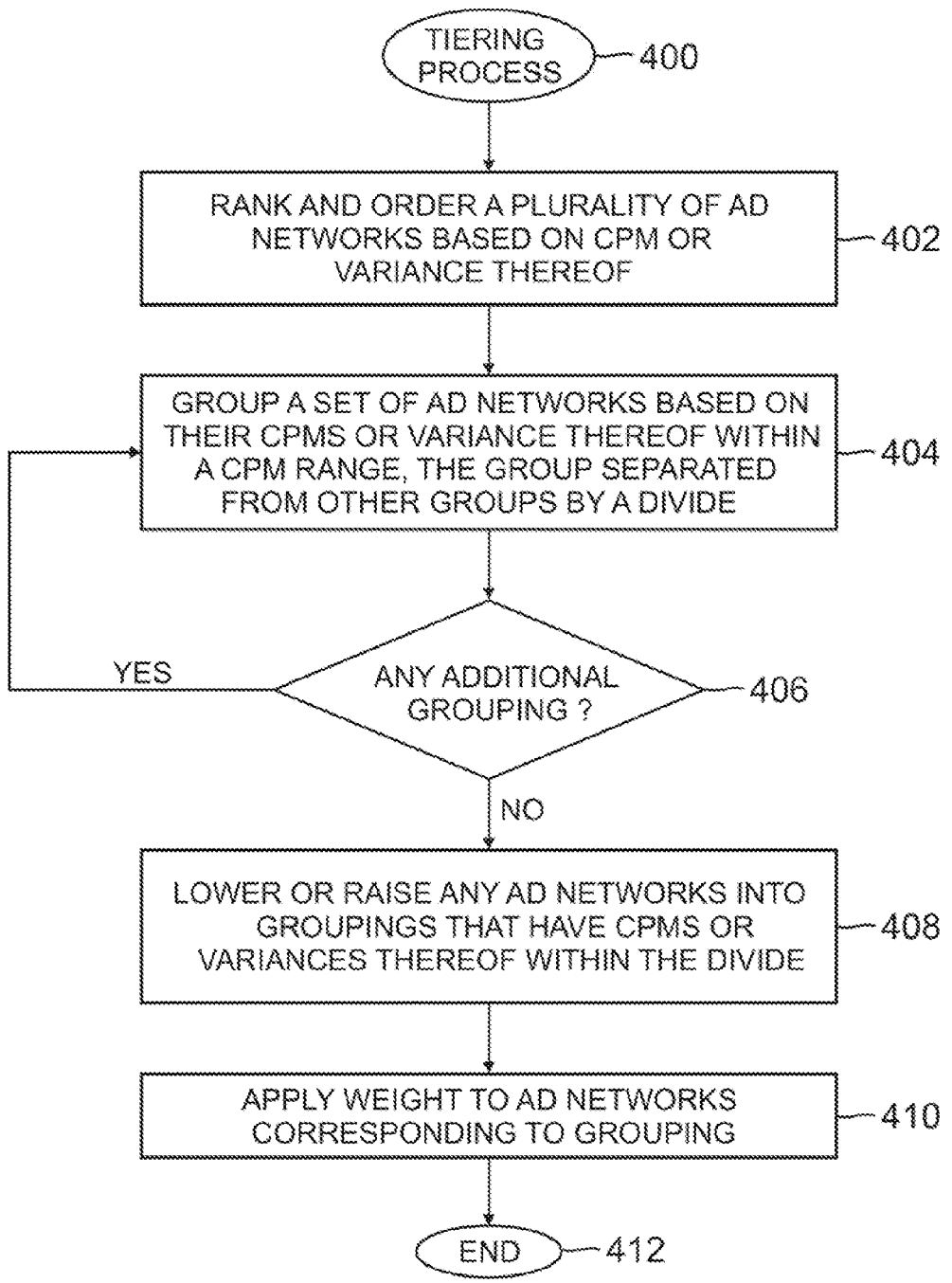
FIG. 4 is a flow chart providing illustrative processes for tiering ad network information for a plurality of ad networks in accordance with one aspect of the present application.

FIG. 4 illustrates high-level processes of one embodiment of the present application for tiering ad network information corresponding to a plurality of ad networks 106. Tiering the information for each ad network 106 allows the ad engine 102 to retrieve ad networks 106 that are producing revenue at a similar level. For example, a tier can represent ad networks 106 that generate a CPM of between $1.00 and $1.07. By traversing through this tier, ad engine 102 can distribute ad network information to user agents 108 that produce similar levels of revenue. By grouping the ad networks 106 into similar tiers each impression is optimized. Furthermore, ad engine 102 keeps users in the highest performing tiers for as many impressions as possible.

To further elaborate on the tiering concept, and returning to FIG. 2, Ad Network Revenue Science 202 has a CPM of $0.84, while Ad Network Google 212 has a CPM of $0.11. The ads provided for by Ad Network Revenue Science 202 throughout provide a higher revenue generation than Ad Network Google 212. In another example, Ad Network Blue Lithium 206 has a CPM of $0.50, while Ad Network Ad.com 208 has a CPM of $0.34. As shown, however, not all ad calls to Ad Network Blue Lithium 206 generate higher revenues than Ad Network Ad.com 208. Nonetheless an ad call to Ad Network Blue Lithium 206 will typically generate more revenue than Ad Network Ad.com 208. Thus, as shown by the provided examples, grouped ad networks 106 having similar CPMs will generally provide higher revenue generation than those ad networks 106 grouped in a lower tier having lower similar CPMs.

While CPM values are used to tier the ad network information, one skilled in the relevant art will appreciate that any pricing data may be used. In addition, other forms of CPM may be used such as eCPM and rCPM.

With reference now to FIG. 4, the tiering process begins at block 400. At block 402, ad engine 102 ranks and orders a plurality of ad networks 106 based on their CPMs or variances thereof. Alternatively, other pricing data may be used. The rankings can be performed by sorting the ad networks 106 from highest CPM to lowest CPM.

In one embodiment, the ad network information can be sorted using a bubble sort. Alternatively, sorting can be done by using the insertion sort, shell sort, merge sort, heap sort, quick sort, bucket sort, radix sort, distribution sort, and shuffle sort algorithms, to name a few. In other embodiments, no sorting algorithm is required. Instead, the plurality of ad networks 106 can be grouped by similar CPMs.

Ad engine 102 then groups together a set of ad networks 106 based on their CPMs or variance thereof within a CPM range at block 404. Generally, the groups are separated from each other by a divide. In one embodiment, the divide represents a ten percent CPM difference between the lowest ad network 106 in a tier to a highest ad network 106 in the next tier. Alternatively, the divides can be an arbitrary difference between the two. In some embodiments, no divide is given. In addition, ad engine 102 can have a set of predetermined CPM tier ranges.

At decision block 406, ad engine 102 determines whether any additional groupings can be made to form another tier. If an additional grouping can be made, ad engine 102 returns to block 404 to group the set of ad networks 106 into another tier. Typically, ad engine 102 can form as many tiers as possible. The only requirement is that the groupings be distinguished one from another, generally by pricing data. Alternatively, the maximum number of tiers can be five.

A set of tiers can also be generated using other distinguishing features between the ad network information. For example, a set of tiers can be generated using the ad size 302 as described in FIG. 3. In addition, ad engine 102 can set up a set of tiers using account 304.

If at decision block 406, ad engine 102 determines that no additional groupings can be made, ad networks 106 that have not fit into any grouping can be lowered or raised into a group based on their CPMs or variance thereof at block 408. Generally, these ad networks 106 will fall into the divides between each tier.

At block 410, and optionally, each ad network 106 with a tier is given the same weight. By applying the same weight to each tier, ad engine 102 can transfer ad networks 106 within tiers. One skilled in the relevant art will appreciate that the weights do not necessarily need to be associated with the ad networks 106 and each ad network 160 within a tier can be tracked through some other process or method. The tiering process ends at block 412.

FIG. 5 shows an exemplary chart 500 which shows the separation of each of the ad networks 106 within the plurality of ad networks 106 into a tier having a tier range. As shown, generally each ad has several attributes, including but not limited to, ad size 502, account 504, network 506, ad tag 508, frequency 510, impressions 514, paid impressions 516, revenue 518, eCPM 520, rCPM 522, and fill rate 524, as described before. In addition, chart 500 shows US Weight 512. Weight 512 represent an arbitrary number whereby all ad networks 106 that are grouped within the same tier are given the same weight so that ad engine 102 can easily find, position, and reposition the ad networks 106 within the tiers. Generally, the larger the weight, the higher the tier.

The weight 512 for each ad network 106 may be dependent on country. For example, and as shown in FIG. 5, the weights 512 correspond to the United States. In other embodiments, a different weight 512 may be provided in different countries, such as the United Kingdom.

Chart 500 shows the ad networks 106 separated into tiers. Tier 1 526 represents those ad networks 106 having an eCPM of $1.00 to $1.07. Tier 2 528 represents those ad networks 106 having an eCPM of $0.41 to $0.57. Tier 3 530 represents those ad networks 106 having an eCPM of $0.18 to $0.50. Tier 4 532 represents those ad networks 106 having an eCPM of $0.00 to $0.10. Tiers may also be set up based on rCPM or any other pricing data.

As further depicted in chart 500, the ad networks 106 within each tier are not sorted. In essence, ad engine 102 will traverse through each ad network 106 within the tier to determine an appropriate ad network 106 to serve an ad. Typically, the ad engine 102 can go through each ad network 106 within the tier to serve the highest paying ad. Because similar revenue generating ad networks 106 are grouped together, the ad engine 102 saves time by traversing only through one tier.

In other embodiments, the plurality of ad networks 106 can be sorted within each tier. The ad engine 102, in this embodiment, would request for ads from the highest ad network 106 within the tier until its frequency cap is met. Thereafter, it would continue with the same process until each ad network 106 within the tier has their frequency cap met. In turn, it would traverse through the lower tiers repeating the same process.

As shown, some tiers contain outliers. Outliers are those ad networks 106 that have a CPM or pricing valuation outside the tier range that it is placed into. For example, Ad Network Google 106 having Ad Tag 508 Google 160×600 has an eCPM 520 of $1.08. However, the tier 526 that the Ad Network 106 is in has an eCPM 520 range of $1.00 to $1.07 making Ad Network Google 106 an outlier. Furthermore, Ad Network Specific Media 106 having Ad Tag 508 RUBICH_Specific has an eCPM 520 of $0.60. However, the tier 528 that the ad network 106 is in has an eCPM 520 range of $0.41 to $0.57 making this Ad Network Specific Media 106 an outlier. In addition, Ad Network BlueLithium 106 having Ad Tag 508 Blue Lithium 160 has an eCPM 520 of $0.74. However, the tier 530 that the Ad Network 106 is in has an eCPM 520 range of $0.18 to $0.50 making this Ad Network 106 an outlier.

Typically, ad networks 106 become outliers after they have been dynamically updated. Because the statistics for each ad network 106 can be measured instantly, ad engine 102 can move the ad networks 106 up and down based on their performance.

Periodically, the tiers can be re-tiered using the processes described in FIG. 4 to remove the outliers. By re-tiering each ad network 106 within the plurality of ad networks 106, those outliers can be shifted up or down within the tiered structure. Ad engine 102 typically re-tiers on a daily, monthly, yearly basis.

Figure 6:
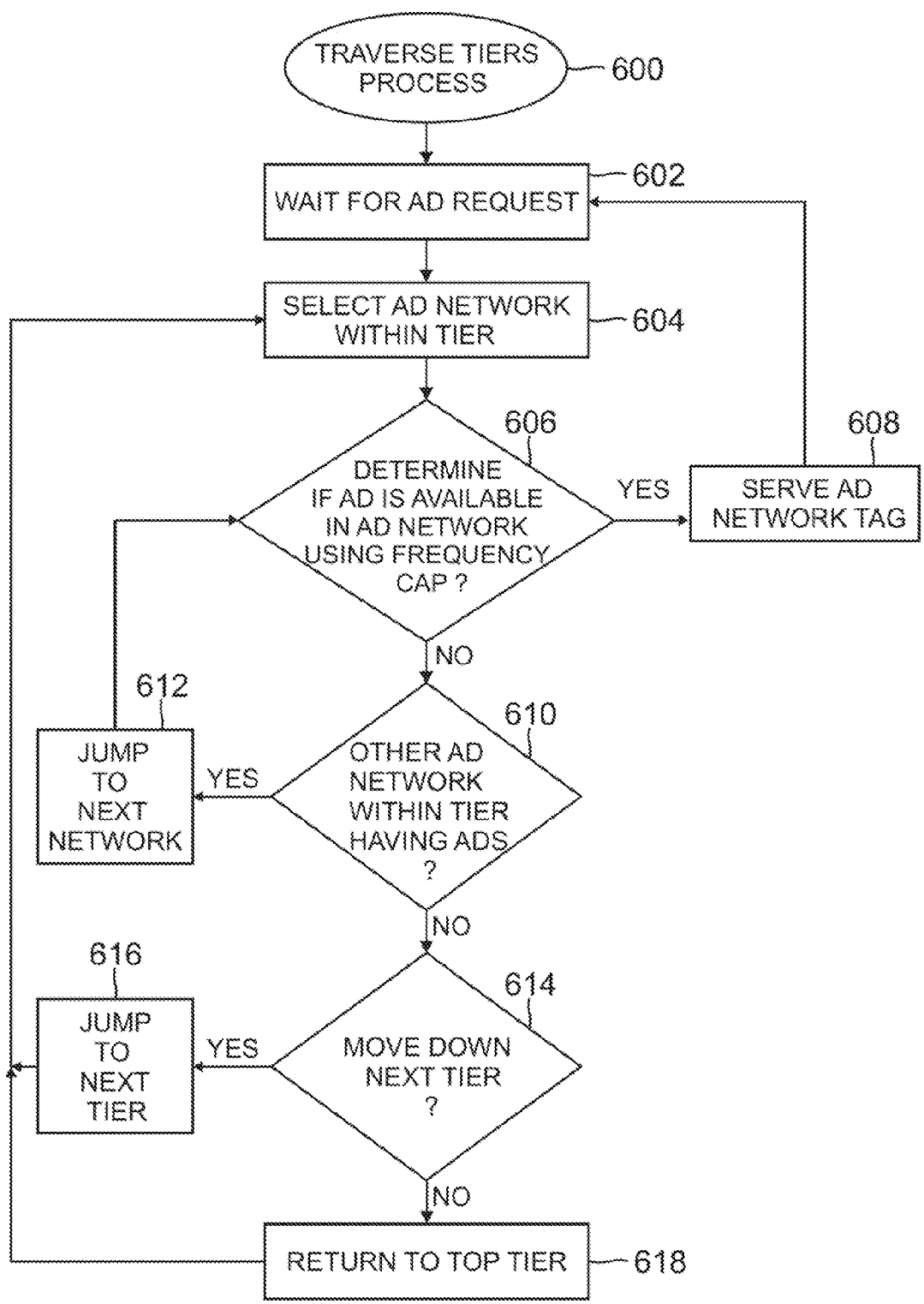
FIG. 6 diagrams a flow chart that provides illustrative processes for traversing through the tiers to retrieve an ad network to serve a paying ad in accordance with one aspect of the present application.

With reference now to FIG. 6, an illustrative flow chart that shows exemplary processes for traversing through the tiers of ad network information to retrieve an ad network 106 to serve an ad is presented. The process begins at block 600. At block 602, ad engine 102 waits for an ad request. Typically, this the request is from a user agent 108 who has received a webpage along with an ad tag from a host server 104. The ad tag, when executed by the user agent 108, directs the user agent 108 to look to the ad engine 102 for an ad network tag that points to a specific ad network 106 so that an advertisement can be retrieved.

At block 604, and after an ad request has been received, ad engine 102 selects an ad network 106 within a tier. Generally, the ad engine 102 begins at the highest tier, which normally contains the highest revenue generating ad networks 106. In one embodiment, the ad engine 102 traverses through each ad network 106 within the tier looking for the ad network 106 with the highest revenue generating ad within the tier. Alternatively, the ad engine 102 randomly selects an ad network 106 with the tier. Often ad networks 106 within the same tier generally have comparable CPMs or pricing data. In other embodiments, the ad engine 102 can select the ad network 106 at the top of the tier after the ad networks 106 in the tier have been sorted by their CPMs.

At determination block 606, the ad engine 102 determines if there is an ad available in the selected ad network 106. Ad engine 102 can normally determine if there is any ad available using the frequency cap for the ad network 106. As described above, the frequency cap can be open or contractual. Typically, the frequency cap is reset after every twenty-four hour period.

When the ad network 106 has determined that there is advertisements that can be served, the ad engine 102 provides the ad network tag that corresponds to the ad network 106 to the requested user agent 102 at block 608. In turn, ad engine 102 returns to block 602.

After determining that an ad network 106 does not have an advertisement for the requesting user agent 108, ad engine 102 determines whether there is another ad network 106 within the tier that has ads at determination block 610. When there is another ad network 106 within the tier, the ad engine 102 jumps to the next ad network 106 within the tier at block 612. In turn, the ad engine 102 returns to determination block 606.

When no other ad networks 106 within the tier have ads, ad engine 102 continues to determination block 614, where the ad engine 102 determines whether any other tiers are left. When there are additional tiers, the ad engine 102 jumps to the next tier at block 616. Typically, this will be the next lower tier. After jumping to the next tier, the ad engine 102 returns to block 604.

Alternatively, and when there are no other tiers (lower tiers), the ad engine 102 can return to the top tier at block 618. In other embodiments, ad engine 102 can go to a default ad network 106, instead of returning to the top tier. Typically, there will be a large number of tiers and ad networks 106 for the ad engine 102 to get through making it unlikely that each ad network 106 in each tier will be traversed. In addition, after a period of time, the ad engine 102 resets itself so that ad engine 102 starts at the top tier again. The period of time can be daily, weekly, monthly, etc. After the top tier is selected, the ad engine 102 returns to block 604.

Figure 7:
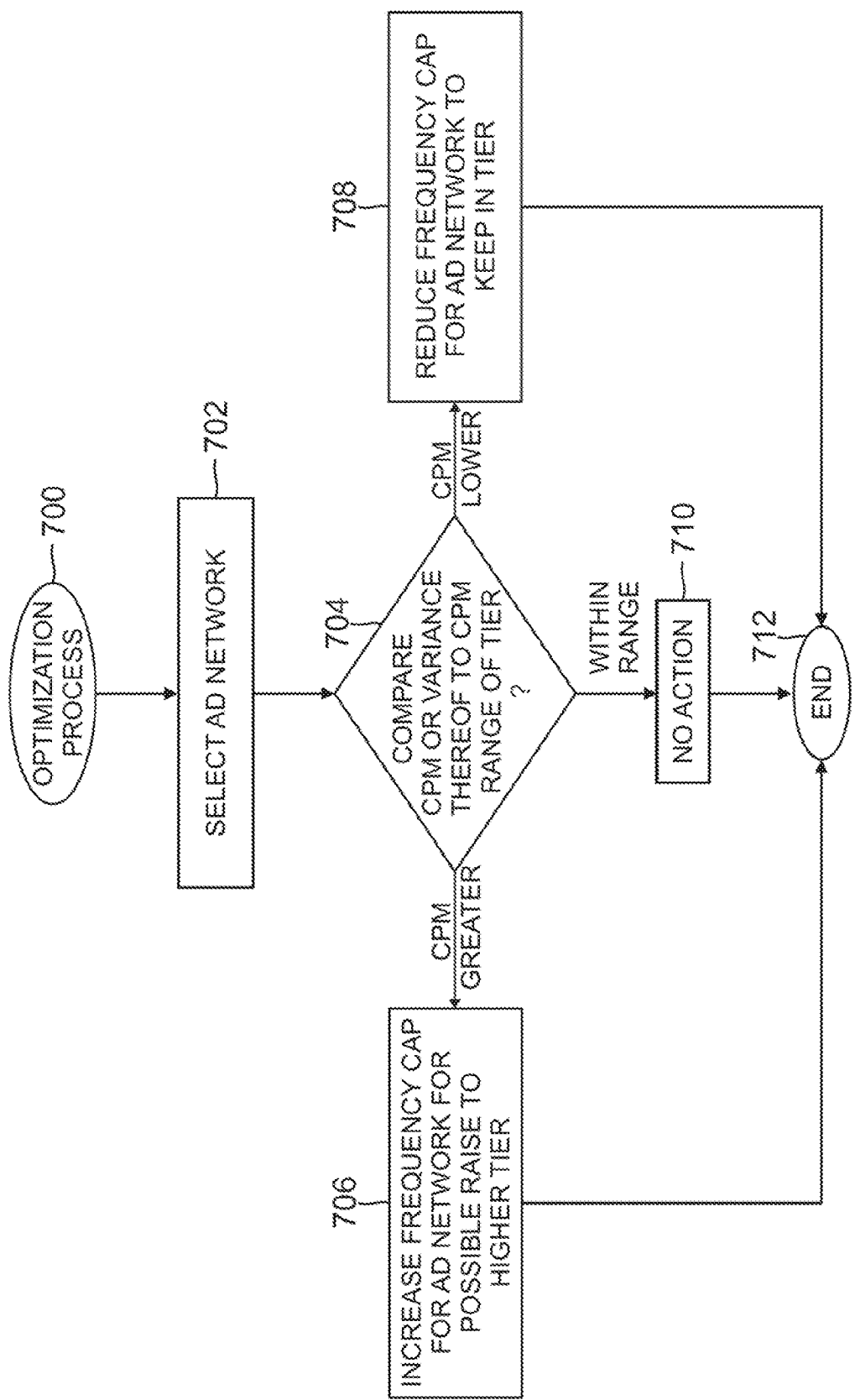
FIG. 7 is a flow chart showing illustrative processes for increasing or decreasing the frequency cap of an ad network to raise an ad network to a higher tier in accordance with one aspect of the present application.

Periodically, the ad networks 106 can be optimized. Optimization results in more ads being displayed by a higher generating revenue ad network 106. In essence, the ad networks can be optimized by adjusting their frequency cap to raise the ad networks 106 to a different tier. FIG. 7 is an exemplary flow chart showing illustrative processes for manipulating the frequency cap of an ad network 106 to raise the ad network 106 to a higher tier. As shown, the optimization process begins at block 700. At block 702 an ad network 106 is selected. Each ad network 106, as described above, is associated with a tier.

At decision block 704, the ad engine 102 compares the CPM of the selected ad network 106 or variance thereof to the CPM range of its tier. Alternatively, ad engine 102 can compare some other pricing data. When the CPM of the ad network 106 is greater than that of its designated tier, the ad engine 102 should display more advertisements from the ad network 106 as it appears that the amount of revenue could increase with more ads from the ad network 106. At block 706, ad engine 706 increases the frequency cap for the ad network 106. In effect, by increasing the ad network's 106 frequency caps more ads will be displayed possibly generating more revenue for ad network 106. This potentially leads to higher paying advertisements.

Increasing the frequency cap refers to allowing more advertisements to be displayed. For example, an ad network 106 that has a frequency cap of two ads per day per user would be increased to three ads per day per user. Increasing the frequency cap can also be referred to as loosening the frequency cap. By increasing the frequency cap, the ad network 106 has the potential to reach a higher tier, and once there, would be called upon more frequently by ad engine 102. After the frequency cap is increased, the optimization process ends at block 712 for that ad network 106. If there are any other ad networks 106, the same process may be used for the other ad networks 106.

Returning to decision block 704, ad engine 102 will reduce the frequency cap for the ad network 106 to potentially keep the ad network 106 within the tier when the ad network's 106 CPM or pricing data is lower than the CPM range of its tier at block 708. In effect, by decreasing the ad network's 106 frequency caps, less ads will be displayed possibly removing less paying or default ads from being displayed by the ad network 106 and increasing the total overall revenue for a host publisher 104. This potentially leads to higher paying advertisements for display from other ad networks 106.

Decreasing the frequency cap refers to allowing less advertisements to be displayed from a particular ad network 106. For example, an ad network 106 that has a frequency cap of three ads per day per user would be decreased to two ads per day per user. Decreasing the frequency cap can also be referred to as tightening the frequency cap. By decreasing the frequency cap, the ad network 106 has the potential to stay within its current tier, or possibly going to a higher tier. When an ad network 106 is raised to a higher tier, the ad engine 102 will more likely use the ad network 106 when it receives ad calls from user agents 108. After the frequency cap is decreased, the optimization process ends at block 712 for that ad network 106. If there are any other ad networks 106, the same process may be used for the other ad networks 106.

Continuing with FIG. 7, and more particularly decision block 704, if the ad network's 106 CPM is within the CPM range for its tier, then no action is taken at block 710. The optimization process ends at block 712 for that ad network 106. If there are any other ad networks 106, the same process may be used for the other ad networks 106.

The optimization process described in FIG. 7 may occur dynamically or periodically for each ad network 106. When periodically, ad engine 102 can change the frequency caps for each ad network 106 on an hourly, daily, or weekly basis. In essence, raising and lowering the frequency caps adjusts the number of ads displayed so that the amount of higher revenue generating ads for display increases. By raising higher revenue generating ad networks 106 to a higher tier, more ads will be displayed by those ad networks 106. By trying to limit the number of ads displayed by an underperforming ad network 106, less ad space will be wasted.

An exemplary chart 800 showing several opportunities for raising an ad network 106 to a higher tier is depicted in FIG. 8. As shown, generally each ad has several attributes, including but not limited to, ad network 802, ad tag 804, frequency 806, impressions 808, paid impressions 810, revenue 812, eCPM 814, rCPM 816, and fill rate 818, as described before. In addition, chart 800 shows oCPM 820 and +/−FCap 822. oCPM refers to an optimized cost per mille impressions and can either be the rCPM or eCPM. +/−FCap 822 represents whether ad engine 102 should tighten or loosen the frequency cap for the particular ad network 106.

As shown in FIG. 8, Ad Network Blue Lithium 106, in tier 6, has an oCPM of $0.71. According to the +/−FCap 822, the frequency cap is loosened meaning that the oCPM of the ad network 106 is above the range for its tier. Ad Network Specific Media 106, in tier 7, has an oCPM of $0.65. According to the +/−FCap 822, the frequency cap is loosened meaning that the oCPM of the ad network 106 is above the range for its tier. Ad Network Advertising.com 106, in tier 7, has an oCPM of $0.64. According to the +/−FCap 822, the frequency cap is loosened meaning that the oCPM of the ad network 106 is above the range for its tier.

Results

By increasing and decreasing the frequency cap for the plurality of ad networks 106, as described above, the ad network optimization system and method thereof provides beneficial results. In one study taken on Dec. 4, 2008, the overall rCPM was $0.41 as shown below:

| Network | eCPM | % of traffic |
|---|---|---|
| 24/7 | $0.27 | 57% |
| Tribal Fusion | $0.88 | 17% |
| Revenue Science | $1.28 | 9% |

After ad engine 102 continuously optimized the plurality of ad networks 106, the overall rCPM, taken on Dec. 11, 2008, was $0.47 as shown below:

| Network | eCPM | % of traffic |
|---|---|---|
| 24/7 | $0.29 | 40% |
| Tribal Fusion | $0.87 | 31% |
| Revenue Science | $1.33 | 15% |

Hardware Environment

Figure 9:
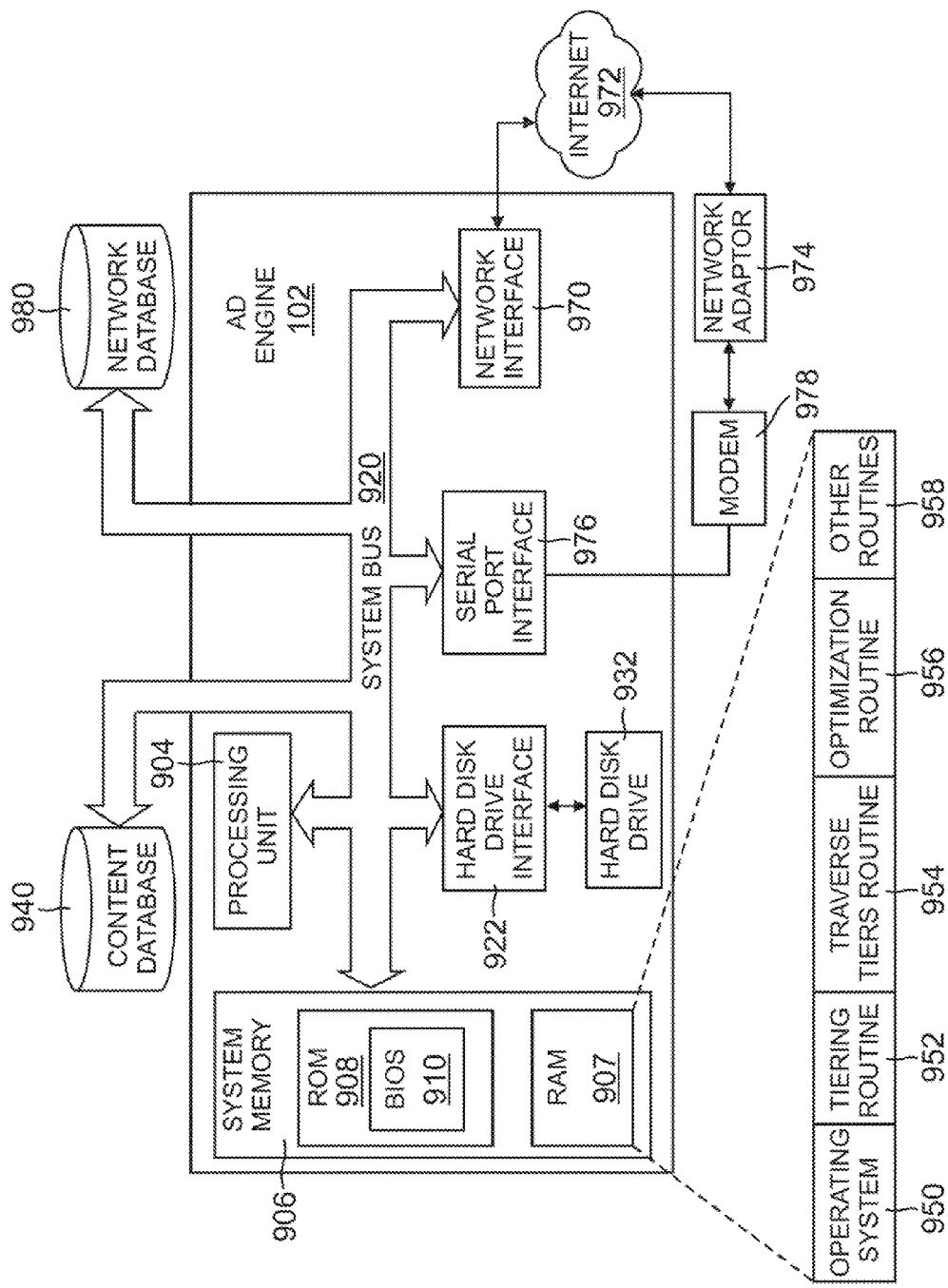
FIG. 9 is an exemplary hardware environment for the ad engine in accordance with one aspect of the present application.

FIG. 9 is an exemplary hardware environment for the ad engine 102 in accordance with one aspect of the present application. Ad engine 102 can include a processing unit 904, a system memory 906, and a system bus 920 that operatively couples various system components, including the system memory 906 to the processing unit 904. The system memory 906 may include read only memory (ROM) 908 and random access memory (RAM) 907. A basic input/output system (BIOS) 910, containing the basic routines that help to transfer information between elements within ad engine 102, such as during start-up, is stored in ROM 908.

Ad engine 102 may include a hard disk drive 932 for reading from and writing to a hard disk, not shown. The hard disk drive 932 is connected to the system bus 920 by a hard disk drive interface 922. A number of program modules may be stored on the hard disk 932, ROM 908, or RAM 907, including an operating system 950, tiering routine 952, traversing tiers routine 954, optimization routine 956, and other routines 958.

Ad engine 102 can be connected to the Internet 972. When used in a LAN environment, ad engine 102 may be connected to the local network through a network interface 970. When used in a WAN environment, ad engine 102 typically includes a modem 978 and a network adapter 974. The modem 978 is connected to the system bus 920 via the serial port interface 976.

Connected to system bus 920 is content database 940 and network database 980. Content database 940 stores ad network tags. These ad network tags can be stored in separate tables listed as JavaScript and IFrame. Network database 980 also stores tables of information. These tables include user information, ads such as house ads, size information, optimization information and stats. A single database can hold both the tables of content database 940 and network database 980. Furthermore, the content database 940 and network database 980 do not have to be external, but may also be internal to ad engine 102.

Ad engine 102 may operate in a networked environment using logical connections to one or more remote computers. These logical connections may be achieved by a communication device coupled to or integral with the ad engine 102; the application is not limited to a particular type of communications device. The remote computer may be another computer, a server, a router, a network personal computer, a client, a peer device, or other common network node. Ad engine 102 can be logically connected to the Internet 972. The logical connection can include a local area network (LAN), wide area network (WAN), personal area network (PAN), campus area network (CAN), metropolitan area network (MAN), or global area network (GAN). Such networking environments are commonplace in office networks, enterprise-wide computer networks, intranets and the Internet, which are all types of networks.

When used in a LAN environment, the ad engine 102 may be connected to the local network through a network interface 970 or adapter 974, which is one type of communications device. When used in a WAN environment, the ad engine 102 typically includes a modem 978, a network adapter 974, or any other type of communications device for establishing communications over the wide area network. The modem 978, which may be internal or external, is connected to the system bus 920 via the serial port interface 976. In a networked environment, program modules depicted relative to the ad engine 102, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The embodiments presented herein of the ad engine 102 are preferably computer programs run on a computer system. One skilled in the relevant art will appreciate that the computer system can include code that is loaded from a hard drive to be run on the processor. Alternatively, the system can be saved on a suitable storage medium such as a diskette, a CD, or like devices.

The system can take the form of an entirely hardware embodiment, an entirely software embodiment or an embodiment containing both hardware and software elements. In one embodiment, the system is implemented in software, which includes but is not limited to firmware, resident software, microcode, etc.

Furthermore, the system can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Described above, aspects of the present application are embodied in a World Wide Web ("WWW") or ("Web") site accessible via the Internet 972. As is well known to those skilled in the art, the term "Internet" refers to the collection of networks and routers that use the Transmission Control Protocol/Internet Protocol ("TCP/IP") to communicate with one another. The Internet 972 can include a plurality of local area networks ("LANs") and a wide area network ("WAN") that are interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet comprises a vast number of such interconnected networks, computers, and routers.

The Internet 972 has recently seen explosive growth by virtue of its ability to link computers located throughout the world. As the Internet 972 has grown, so, has the WWW. As is appreciated by those skilled in the art, the WWW is a vast collection of interconnected or "hypertext" documents written in HTML, or other markup languages, that are electronically stored at or dynamically generated by "WWW sites" or "Web sites" throughout the Internet. Additionally, client-side software programs that communicate over the Web using the TCP/IP protocol are part of the WWW, such as web browsers, SOAP clients, JavaScript, Java Applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present application could apply in any such interactive communication environments, however, for purposes of discussion, the Web is used as an exemplary interactive hypertext environment with regard to the present application.

A website is a server/computer connected to the Internet 972 that has storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a website elsewhere on the Internet 972. Each hyperlink is assigned a URL that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Mozilla. Firefox or Microsoft's Internet Explorer, is a software application program for providing a user interface to the WWW. Upon request from the remote access user via the web browser, the web browser requests the desired hypertext document from the appropriate web server using the URL for the document and the hypertext transport protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JavaScript or JAVA applets, for execution on the client computer. Finally, the WWW browser may include optional software components, called plug-ins, that run specialized functionality within the browser.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the claims. Moreover, nothing disclosed herein is intended to be dedicated to the public regardless of whether such disclosure is explicitly recited in the claims.

What is claimed is:

1. An ad engine comprising:
   a server connected to a network comprising:
   at least one processor;
   a network interface configured to communicate with a plurality of ad network servers and a plurality of user agents;
   a database, being stored by a storage unit, configured to store:
   ad network information about a plurality of ad networks, the ad networks comprising ad network servers configured to receive ad queries from user agents and to serve ads in response to the ad queries from the user agents, wherein a user agent comprises a network computing device, the ad network information including:
   pricing data associated with ad calls,
   frequency caps, and
   ad network tags for each ad network within the plurality of ad networks, the ad network information grouped within tiers according to each ad network's pricing data and each ad network capable of changing tiers using its frequency cap, wherein a given frequency cap is configured to control how many times a given ad network tag can be served to a given user agent in a specified time period, the tiered ad network information being separated into tiers by pricing data ranges; and a memory operatively coupled to the at least one processor, the memory storing program instructions which, when executed by the at least one processor, causes the at least one processor to:
  interact with the plurality of ad networks simultaneously;
  receive pricing data associated with ad calls of the plurality of ad networks;
  utilize the tiers to avoid using one ad network exclusively by inhibiting serving ad network tags for an ad network that has met its frequency cap;
  group ad networks having similar pricing data within tiers, wherein at least one of the tiers includes a plurality of ad networks;
  utilize the frequency caps in determining which ad network tags, corresponding to the plurality of ad networks, to place on user agents;
  receive, via the network interface, requests for ad network tags from user agents over the network;
  traverse through the tiers of ad network information to select ad networks tags of respective ad networks, by:
    searching through and identifying a highest tier ad network whose frequency cap has not been met, wherein if a first highest tier ad network's frequency cap has been met, the search continues at a next lower tier to identify a next lower tier ad network whose frequency cap has not been met;
    selecting ad network tags corresponding to the identified highest tier ad network whose frequency cap has not been met;
  return, via the network interface, the selected ad network tags, corresponding to the identified highest tier ad network whose frequency cap has not been met, to the user agents in response to the requests from the user agents to cause the user agents to request ads from ad network servers of the identified highest tier ad network whose frequency cap has not been met, corresponding to the selected ad networks tags;
  periodically, based at least in part on the pricing data for the plurality of ad networks, increase the frequency cap for each ad network when its pricing data is above the price data range for its tier; and
  periodically, based at least in part on the pricing data for the plurality of ad network servers, decrease the frequency cap for each ad network when its pricing data is below the price data range for its tier.

2. The ad engine according to claim 1, wherein traversing through the tiered ad network information to select ad networks further includes returning to the highest tier if there is no next lower tier.

3. The ad engine according to claim 1, wherein increasing and decreasing the frequency cap for each ad network occurs periodically.

4. The ad engine according to claim 3, wherein periodically is hourly.

5. The ad engine according to claim 3, wherein periodically is daily.

6. The ad engine according to claim 3, wherein periodically is weekly.

7. The ad engine according to claim 1, wherein the memory storing program instructions which, when executed by the at least one processor, further causes the at least one processor to associate each ad network of the plurality of ad networks to a tier based on the pricing data of the ad network, wherein each tier has a pricing data range.

8. The ad engine according to claim 1, wherein the memory storing program instructions which, when executed by the at least one processor, further causes the at least one processor to tier a plurality of ad networks based on their cost per thousand (CPM) impressions with each tier having a CPM range.

9. A method for managing a plurality of ad networks so that optimal ads from the plurality of ad networks are provided to user agents, said method comprising:
  receiving over a network, by an ad engine configured to communicate simultaneously with a plurality of ad network servers and a plurality of user agents, the ad engine comprising a processor, requests for ad network tags from the user agents, the user agents comprising computing devices, and
  responding, by the ad engine processor, to the requests by serving ad network tags corresponding to the plurality of ad networks, the ad network tags identifying ad networks that serve ads and are tiered based on their pricing data, tiered ad network information being separated into tiers by pricing data ranges, wherein the ad engine is configured to utilize the tiers to avoid using one ad network exclusively by inhibiting serving ad network tags for an ad network that has met a corresponding frequency cap, and ad networks having similar pricing data are grouped within tiers, wherein at least one of the tiers includes a plurality of ad networks;
  wherein the corresponding frequency cap is configured to control how many times a given ad network tag can be served to a given user agent in a specified time period;
  for received requests for ad network tags from the user agents over the network:
    searching through and identifying and selecting a highest tier ad network whose frequency cap has not been met by traversing, by the processor, through the ad network tags starting at a highest tier and going through each tier until an ad network is selected, the ad network being selected when a frequency cap for the ad network has not been met;
    retrieving from a storage unit, by the processor, an ad network tag associated with the selected ad network whose frequency cap has not been met;
    sending, by the processor, the ad network tag associated with the selected ad network whose frequency cap has not been met in response to the received request for ad network information over the network to the user agent;
    periodically, increasing the frequency cap for each ad network when its pricing data is above the price data range for its tier; and
    periodically, decreasing the frequency cap for each ad network when its pricing data is below the price data range for its tier.

10. The method according to claim 9, wherein the frequency cap is updated after the ad network has been selected.

11. The method according to claim 9, wherein the ad network tags tiered by their pricing data is sorted from highest CPM to lowest CPM within each tier.

12. The method according to claim 9, wherein the tiers vary from country to country.

13. The method according to claim 9, wherein the ad networks are tiered into five tiers.

14. The method according to claim 9, wherein traversing through the ad network tags at a highest tier is restarted after a period of time.

15. The method according to claim 9, further comprising associating each ad network of the ad networks to a tier based on the pricing data of the ad network, wherein each tier has a pricing data range.

16. The method according to claim 9, further comprising tiering a plurality of ad networks based on their cost per thousand (CPM) impressions with each tier having a CPM range.

17. The method according to claim 9, further comprising dynamically updating the pricing data of the ad networks.

* * * * *